(12) United States Patent
Ginetti et al.

(10) Patent No.: US 9,761,204 B1
(45) Date of Patent: Sep. 12, 2017

(54) SYSTEM AND METHOD FOR ACCELERATED GRAPHIC RENDERING OF DESIGN LAYOUT HAVING VARIOUSLY SIZED GEOMETRIC OBJECTS

(71) Applicant: CADENCE DESIGN SYSTEMS, INC., San Jose, CA (US)

(72) Inventors: Arnold Ginetti, Antibes (FR); Jean-Noel Pic, Valbonne (FR); Philippe Bourdon, Calvi (FR); Gerard Tarroux, Villeneuve-Loubet (FR)

(73) Assignee: Cadence Design Systems, Inc., San Jose, CA (US)

( * ) Notice: Subject to any disclaimer, the term of this patent is extended or adjusted under 35 U.S.C. 154(b) by 193 days.

(21) Appl. No.: 14/501,219

(22) Filed: Sep. 30, 2014

(51) Int. Cl.
*G06T 1/20* (2006.01)
*G09G 5/36* (2006.01)
*G06T 1/60* (2006.01)
*G09G 5/377* (2006.01)

(52) U.S. Cl.
CPC ............... *G09G 5/363* (2013.01); *G06T 1/20* (2013.01); *G06T 1/60* (2013.01); *G09G 5/377* (2013.01); *G09G 2340/10* (2013.01); *G09G 2360/02* (2013.01)

(58) Field of Classification Search
CPC . G06T 1/60; G06T 1/20; G09G 5/363; G09G 5/377
USPC ........................................................ 345/630
See application file for complete search history.

(56) References Cited

U.S. PATENT DOCUMENTS

| | | | |
|---|---|---|---|
| 7,937,256 B2 | 5/2011 | Tseng et al. | |
| 8,160,858 B2 | 4/2012 | Tseng et al. | |
| 8,407,228 B1 | 3/2013 | Hahn et al. | |
| 8,413,087 B1 | 4/2013 | Rao et al. | |
| 8,413,093 B1 | 4/2013 | Rao et al. | |
| 8,453,091 B1 | 5/2013 | Rao et al. | |
| 2007/0013709 A1* | 1/2007 | Charles | G06F 17/50 345/581 |
| 2007/0067106 A1* | 3/2007 | Antoine | G06T 9/40 702/5 |
| 2007/0168392 A1* | 7/2007 | Delarue | G06F 17/50 |
| 2008/0074423 A1* | 3/2008 | Gan | G06F 17/30241 345/427 |
| 2013/0300764 A1* | 11/2013 | Gardenfors | G01C 21/367 345/629 |

* cited by examiner

*Primary Examiner* — Barry Drennan
*Assistant Examiner* — Terrell Robinson
(74) *Attorney, Agent, or Firm* — Rosenberg, Klein & Lee

(57) ABSTRACT

A system and method are provided for accelerated graphic rendering a view of a design layout view represented by a plurality of graphic objects defined by respective geometry data therefor. A database stores the geometry data having location and geometric portions. A large object module actuates retrieval of the geometry data for each of the graphic objects within the view selectively classified to be a large object. A small object module actuates partial retrieval of the geometry data for each of the graphic objects within the view selectively classified to be a small object, the location portion being thereby retrieved exclusive of the geometric portion of the geometry data for each small object. A rendering control module generates a composite image of the design layout view for display, which includes a geometric reproduction of each large object and an abstracted representation of each small object within the view.

20 Claims, 20 Drawing Sheets

High Resolution Small Object cache

Low Resolution Small Object cache

Small Object Cache After Querying L2 small objects

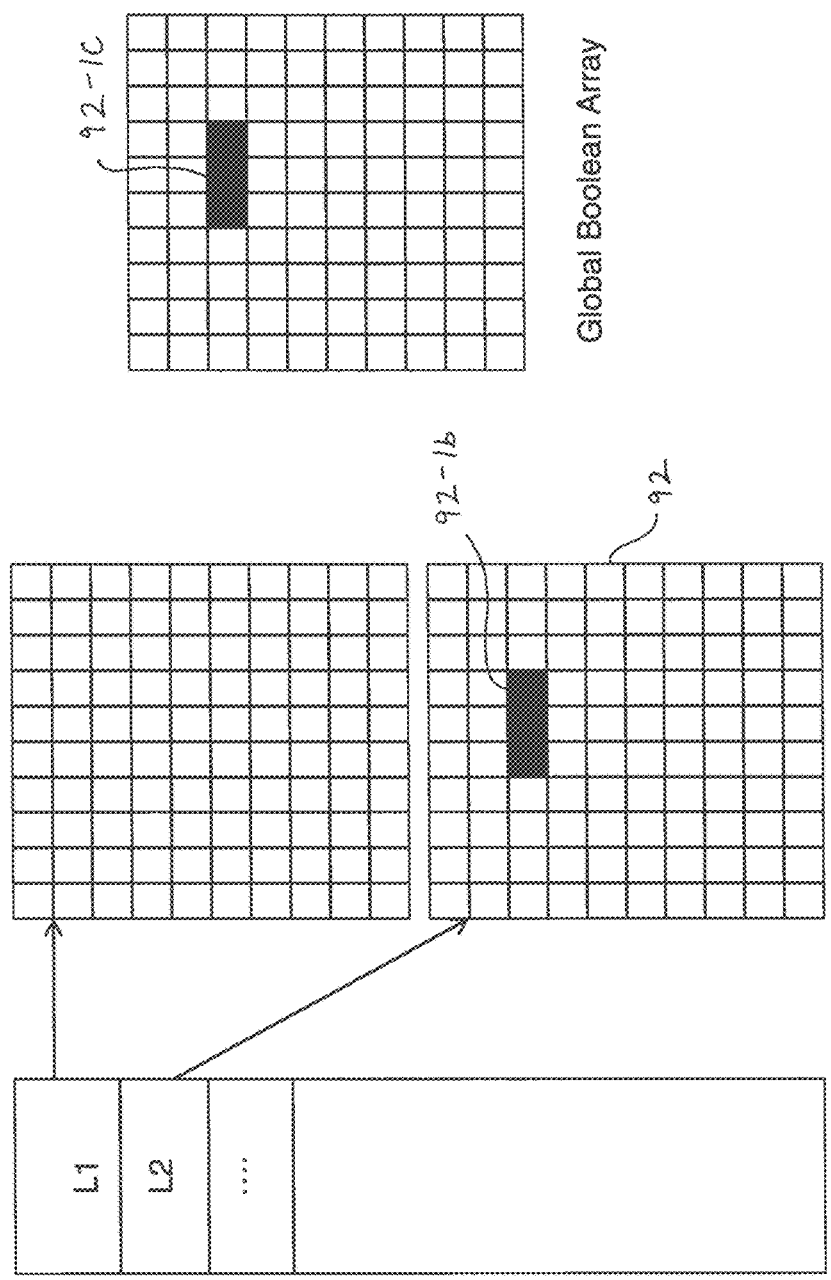

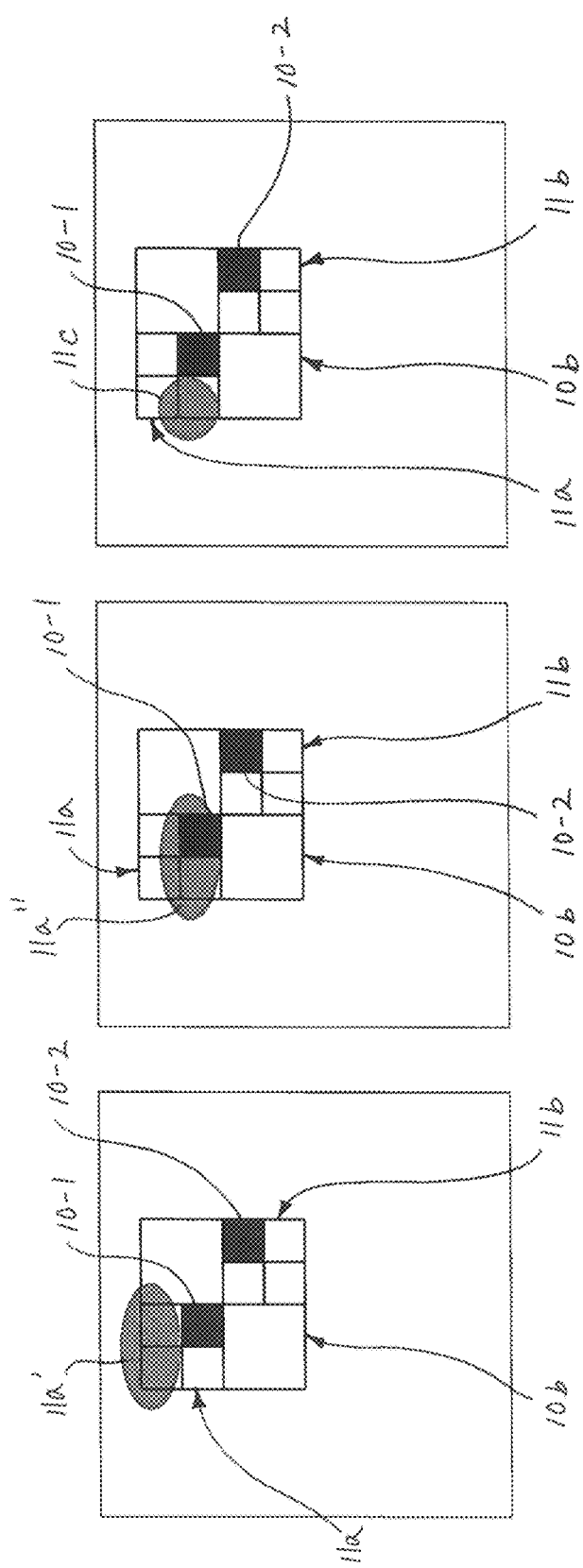

| IC A | IC B | |
|---|---|---|
| Filter Size | Filter Size | Small Objects |
| 0 | 5 | High Resolution |
| N/A | 5 | Low Resolution |
| 1 to 4 | N/A | N/A |
| 5 (or more) | 5 (or more) | None |
| N/A | 5 (or more) | High Resolution |
| N/A | 5 (or more) | Low Resolution |

FIG. 14A

| IC A | IC B | |
|---|---|---|
| Filter Size | Filter Size | Small Objects |
| 0 | 5 | High Resolution |
| N/A | 5 | Low Resolution |
| 1 to 4 | 1 to 4 | None |
| N/A | 1 to 4 | Low Resolution |
| N/A | 1 to 4 | High Resolution |
| 5 (or more) | 5 (or more) | None |
| N/A | 5 (or more) | High Resolution |
| N/A | 5 (or more) | Low Resolution |

FIG. 14B

SYSTEM AND METHOD FOR ACCELERATED GRAPHIC RENDERING OF DESIGN LAYOUT HAVING VARIOUSLY SIZED GEOMETRIC OBJECTS

BACKGROUND OF THE INVENTION

The subject system and method are generally directed to optimizing the graphic rendering performance of a system which displays views of design layouts. More specifically, the subject system and method provide for the abstracted representation of geometrically small objects within a given view of a design layout, along with non-abstracted representation of geometrically larger objects. This accelerates the speed performance without unduly hiding design layout details from view.

SUMMARY OF THE INVENTION

It is an object of the present invention to provide a system and method which enhance efficiency in graphically rendering a view of a design layout defined by a plurality of graphic objects having geometric features.

It is another object of the present invention to provide a system and method which accelerate the speed of graphic rendering while preserving certain small object features.

These and other objects are attained in a display system for accelerated graphic rendering of a design layout view, where the design layout is represented by a plurality of graphic objects defined by respective geometry data therefor. The system comprises a database storing the geometry data, with the geometry data for each of the graphic objects including location and geometric portions. The system also comprises large and small object modules, wherein the large object module actuates retrieval of the geometry data for each of the graphic objects within the view selectively classified according to user-defined criteria to be a large object. The small object module actuates partial retrieval of the geometry data for each of the graphic objects within the view selectively classified according to user-defined criteria to be a small object, the location portion being thereby retrieved exclusive of the geometric portion of the geometry data for each small object. The system further comprises a rendering control module coupled to selectively actuate the large and small object modules to generate a composite image of the design layout view for display. The composite image includes a geometric reproduction of each large object within the view based on the geometry data retrieved therefor; and, at least one indicia visually indicating a location of each small object within the view based on the location portion of the geometry data retrieved therefor.

A display method implemented in accordance with certain embodiments of the present invention provides for accelerated graphic rendering of a design layout view, where the design layout is represented by a plurality of graphic objects defined by respective geometry data therefor. The method comprises storing the geometry data in a database, the geometry data for each of the graphic objects including location and geometric portions. Both the location and geometric portions of the geometry data are selectively retrieved for each graphic object within the view selectively classified according to user-defined criteria to be a large object. For each graphic object within the view selectively classified according to user-defined criteria to be a small object, the location portion is partially retrieved exclusive of the geometric portion of the object's geometry data. At least one small object cache is maintained, which object cache is populated with indicia placement data for the small objects responsive to the location portion of the geometry data retrieved therefor. The indicia placement data indicates pixel coverage of the small objects within a display area. A composite image of the design layout view is selectively generated for rendering on the display area. The composite image includes a geometric reproduction of each large object within the view based on the geometry data retrieved therefor. The composite image also includes at least one indicia visually indicating a location of each small object within the view, based on the location portion of the geometry data retrieved therefor.

A display system implemented in accordance with certain embodiments of the present invention provides for accelerated graphic rendering of a view of a design layout represented by a plurality of graphic objects defined by respective geometry data therefor. The system comprises a database of predetermined format storing the geometry data, which may be of any suitable format known in the art, with the geometry data for each of the graphic objects including location and geometric portions. A large object module actuates retrieval of the geometry data for each of the graphic objects within the view selectively classified according to user-defined criteria to be a large object. A small object module actuates partial retrieval of the geometry data for each of the graphic objects within the view selectively classified according to user-defined criteria to be a small object, whereby location portion is retrieved exclusive of the geometric portion of the geometry data for each small object. The small object module includes at least one small object cache populated with indicia placement data for the small objects responsive to the location portion of the geometry data retrieved therefor. The indicia placement data serves to indicate pixel coverage of the small objects within a display area. A global array maintained in the small object cache is formed by a plurality of pixel-based cells each corresponding to a selectively defined marker cell in the display area. Each marker cell contains at least one pixel of the display area. Occurrences of the indicia are selectively represented in the global array by filling the pixel-based cells with indicia placement data. The global array defines a locus of marker cells visibly occupied by the small objects. A query execution module is provided which includes a suitable application programming interface tool executed to selectively retrieve from the database at least a portion of the geometric data for the graphic objects responsive to a query transmitted thereto by the large and small object modules. A rendering control module is coupled to selectively actuate the large and small object modules to generate a composite image of the design layout for rendering within the display area. The composite image including a geometric reproduction of each large object within the view based on the geometry data retrieved therefor; and, at least one indicia visually indicating a location of each small object within the view based on the location portion of the geometry data retrieved therefor.

BRIEF DESCRIPTION OF THE DRAWINGS

FIG. 9B is a schematic diagram illustrating the filling of the appropriate layout layers' local array and global array within a small object cache employed in the embodiment of FIG. 3, for the shape samples illustrated in FIG. 9A;

FIGS. 11A-11C are schematic diagrams further illustrating certain aspects of a modification of the partitioning process illustrated in FIGS. 10A-10C in certain other implementations of the embodiment of FIG. 3;

FIGS. 14A and 14B are correspondence tables comparatively illustrating flexibility of configuration display control options afforded by a conventional layout editing/viewing implementation and a comparable implementation employing the embodiment of FIG. 3; and, FIG. 15 is a block diagram illustrating an exemplary interconnection of units in a processor-based system for implementing the embodiments of systems and methods according to various aspects of the present invention.

DETAILED DESCRIPTION OF THE PREFERRED EMBODIMENTS

Figure 1A:
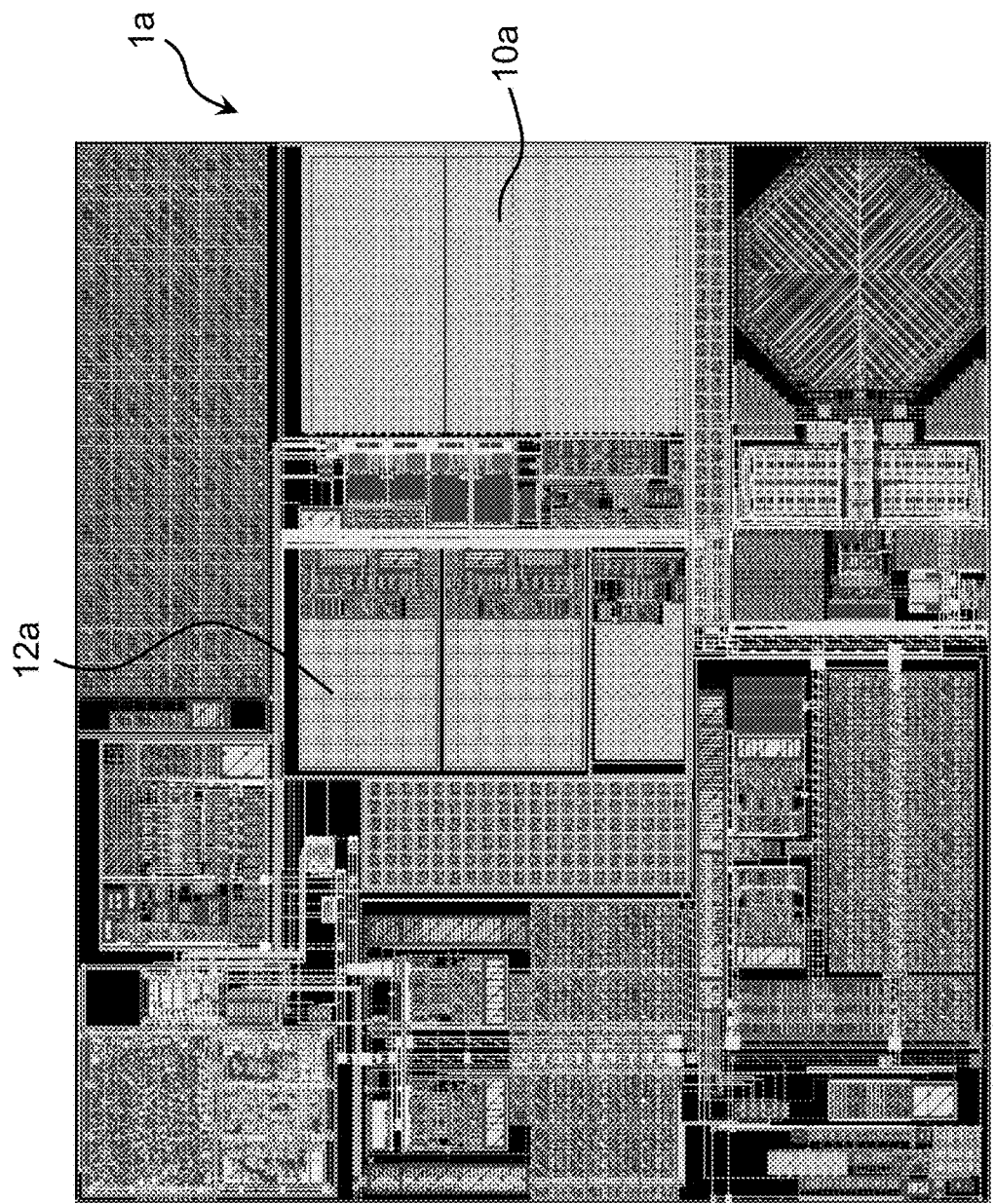
FIG. 1A is a graphic rendering illustrating one view of a sample design layout for an electronic system, rendered without any size-filtering of graphic objects.

In Electronic Design Automation (EDA) and in other contexts for generating electronic designs, such as electronic designs for printed circuit boards, integrated circuit devices, and the like, the given design is graphically represented by a design layout. The components and other elements of the design layout are graphically rendered using combinations of graphic objects having geometric shapes and features, as defined by the objects' geometry data stored in a layout database. As is known in the art, the contents of the geometry data include portions relating to the graphic objects' location within the design layout as well as portions relating to the graphic objects' geometric features (such as shape, orientation, color, stippling, and the like).

A typical device may be graphically defined by something on the order of 10 to 25 geometric shapes/features like rectangles and other polygons. Interconnections between devices may typically be represented by one geometric shape if it is a short connection (such as one rectangle). If the interconnected devices are spaced farther apart, numerous different geometries may be used to represent the interconnection, especially if as it traverses different layers and requires vias to connect between different layers. So even interconnections may be represented by 10, 15, 20, 25, or more geometries.

As also known in the art, the layout database typically grows quite complex, especially for state of the art designs, and suitable measures are known in the art to maintain the geometry data in a systematically retrievable form. A database standard widely used in the art stores the data in highly compacted form. Various predetermined application programming interface (API) tools readily available in the art may be invoked to process data retrieval queries to locate, un-compact, then deliver requested portions of the geometry data to a calling module.

Design platforms providing for layout editor application, for example, enable a user to call up a certain layout design for a particular board, system, device, circuit (or a portion thereof) for graphic rendering within a display area. The display area may be defined in any suitable manner according to the particular requirements of the intended application using suitable display hardware known in the art. Whether directly displayed or projected onto a non-active viewing surface, the display area is preferably formed at the finest level of granularity by an array of resolution-defining display elements. Such resolution-defining elements are generally referred to herein as 'pixels,' the term being used without regard to the physical properties or makeup of an individual element.

Absent remedial measures, simply rendering all the graphic objects of a design layout within a view typically takes an unduly long time to render on the display area. Databases for design layouts of even modest complexity are becoming increasingly bigger, often to the point of containing billions of geometries on multiple layout layers. When a layout editor opens such a database and fully renders the design layout for displayed on a display area, the minute details of the smaller graphic objects may not be discernible enough to be of meaningful use. They may even bleed together to visually wash out other more discernible details. Briefly, the subject system and method are generally directed to efficiently displaying the content of a layout database on a given display screen, and doing so without unduly omitting or otherwise obscuring pertinent layout details.

Turning to FIG. 1A, a full graphic rendering 1a of a sample design layout within a display area is illustrated. This graphic rendering displays all of the graphic object geometries in the database for the design layout 1a. Such geometries typically represent, for instance, devices like transistors, power rails, interconnections, routing of vias between layers, and the like. While shown in gray scale, the graphic rendering presents the geometries preferably in various colors, coded according to the requirements of the particularly intended application. Regions such as that marked 10*a* may represent devices like transistors or diodes, or interconnection between devices. With the total number of devices in the illustrated sample ranging perhaps in the hundreds millions, the geometries of the smaller graphic objects in this view are simply too minute to be recognizable. What is more, they so clutter the region 10*a* that geometric details of other larger objects within the same region are obscured. This is the case for other regions of the layout, like the region 12*a*.

Figure 1B:
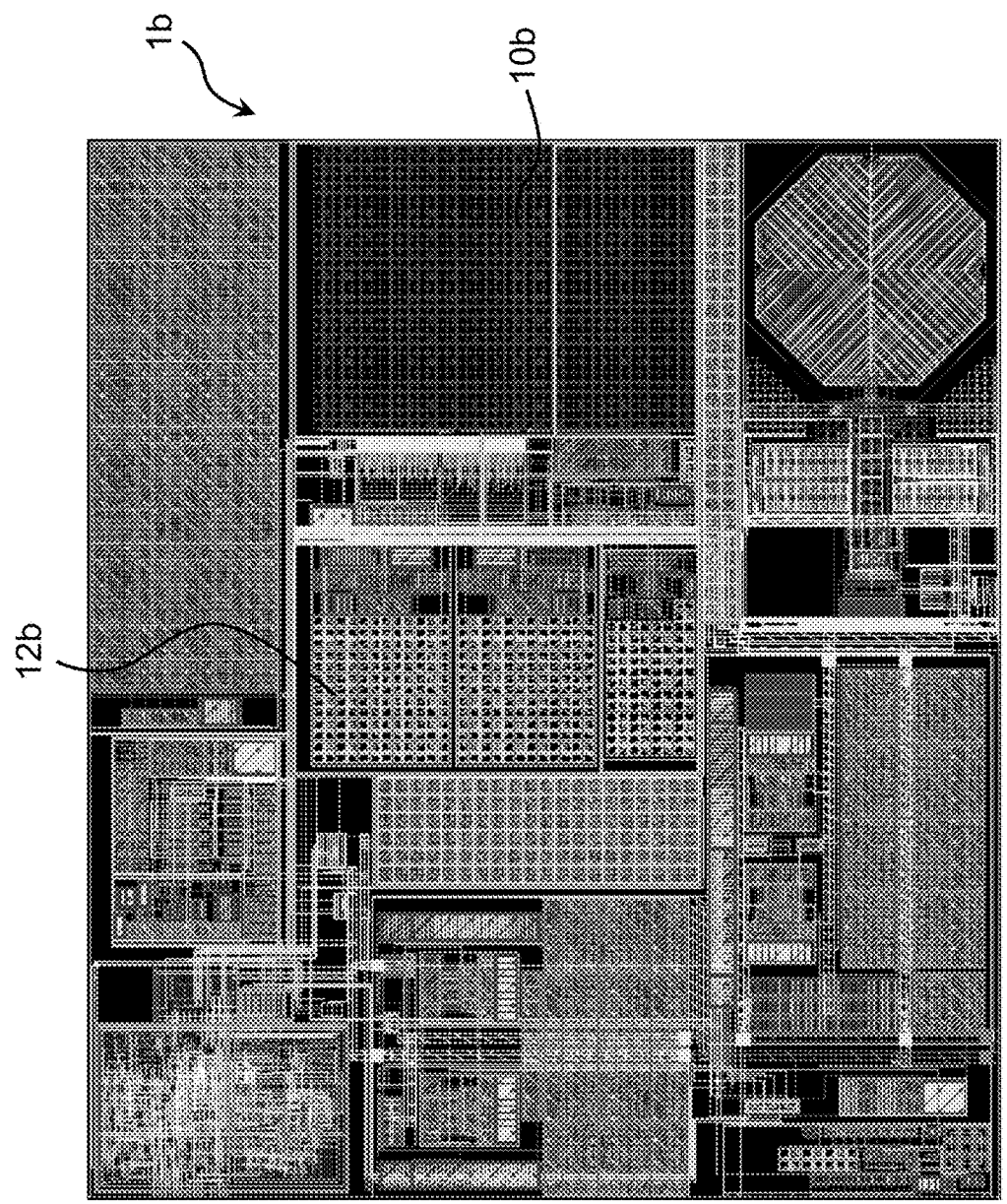
FIG. 1B is a graphic rendering of the view shown in FIG. 1A, but with size-filtering at a predetermined filter size value with conventional rendering measures.

Systems heretofore known address this problem by providing an object size filtering measure. A filter size parameter is set to a certain selectable value (a value of 6 for instance) that denotes a minimum span of pixels required along each dimensional reference of the display area for classification as a large enough object to display. Any graphic object spanning less than this minimum number of pixels along any dimensional reference of the display area is classified as a small object and precluded from displaying. FIG. 1B illustrates a size-filtered graphic rendering 1*b* of the same sample design layout of FIG. 1A, but with the filter size parameter set to 6 pixels. As shown, this graphic rendering 1*b* excludes many of the small objects visible in rendering 1*a*, leaving regions like regions 10*b*, 12*b* noticeably de-cluttered. This allows better visibility of the filtered large objects, but the viewer is left with no indication that so much of the design layout details have been hidden from view.

Rendering graphic objects with their full geometry data requires all of their constituent geometries to be appropriately located and displayed them on the display area, with the right colors. The geometric portion of the geometry data, when suitably queried, identifies such geometric attributes as the color that a shape should be displayed in. Querying the database billions of time to obtain such geometric features for all graphic objects making up the design layout being viewed consumes an excessive amount of time.

The sample design layout illustrated in FIGS. 1A and 1B would be considered a medium sized design by current standards in the art. Even for this medium sized design, the full unfiltered rendering shown in FIG. 1A is found to take about 150 seconds to display the design layout using a typical layout editing platform. This would be less than acceptable for most users. If a user were to pan or zoom a view of the design during a work session, the delay would require the user to wait up to 150 seconds for each viewing operation.

The object size filtering option can improve dramatically upon this time delay. In the example of FIG. 1B, with the filter size set to 6 pixels to exclude a substantial body of geometric detail, the time to display the filtered rendering 1*b* drops to about 0.5 seconds. But this time savings is at the cost of undue loss in design detail, and far from ideal tradeoff in most cases.

Such object size filtering is essentially binary. That is, it necessarily displays all or nothing of the graphic objects for a particular view. There is no tradeoff provision in between for effectively abstracting small objects without bogging down the rendering process. Another drawback is that object size filtering actually offers little meaningful adjustability. Users may set the filter size to low values well below 6 pixels, for example, but setting the value to something less than 5 pixels would be ineffectual in most systems, as it would exceed the limits of most users' optical discrimination. Nonetheless, such size-filtering of objects remains in conventional layout editing systems the exclusive mechanism for controlling the performance graphic rendering.

Users of conventional systems are often misled by the illusion of empty areas on the layout that are not actually empty at all. Upon zooming into a design view, for instance, they find a plethora of surprising detail that had eluded them in previous view(s). Re-sizing the object filter, then, to permit the inclusion of smaller objects only loads the rendering process down with the additional objects' geometric details, invariably impeding the speed of rendering once again—all to the great frustration of users.

In accordance with certain aspects of the present invention, the subject system and method provide for the effective representation of small objects within a given view of a design layout, while preserving much of the speed performance captured by object size filtering. Depending on such viewing/display factors like the selected zoom level, a "view" of the design layout may include all or a portion of the entire layout for rendering within a particular display area. It is to be understood that, unless otherwise noted, references herein to a composite image or other graphic rendering of the design layout for visual representation on the display area relate to this view of the design layout which may encompass the whole layout or a portion thereof.

The system and method preferably retain a user-selectable object filtering control parameter(s), but also provides visual indication of small objects while sparing a rendering control module from having to retrieve and process the full load of geometry data therefor. This enables independent improvement of rendering performance separate from adjustment of object filtering knob, which may be kept at the limit of users' visual acuity (such as 5 pixels with most systems' hardware).

Briefly, the subject system and method first effect numerous small area queries within the database when a display of the given layout is to be initially generated or refreshed. The goal of this process is to find out whether a given pixel on the given display area (such as defined on a monitor screen) is covered by a small geometry object within the database. When it is determined whether a pixel (or group of pixels) is or is not covered by a small geometry object within the database, indicative data is accordingly stored for that pixel/pixel group, preferably though not necessarily within a suitable cache. For multi-layered layouts, this process is carried out from the uppermost to the lowermost layers (L's). The same query need not be made to the layout database for lower layers as to that pixel/pixel group thereafter.

These queries to detect pixel coverage by a small geometry object may be conducted very quickly with suitable types of databases and attendant access measures known in the art. For each of the pixels/pixel groups on the screen display area, the subject system and method effectively ask the predetermined database: is there a small geometry object at that location or not? With a display area having several thousand pixels along one reference dimension and several thousand pixels along another reference dimension, there may be something on the order of four million total display pixels. While the system and method preferably employ optimizing measures to reduce the number of necessary queries, they may potentially ask up to four million questions to the layout database in order to determine whether a small geometry is found at each of this display area's pixels/pixel groups or not.

For a multi-layered design layout, this may yield a billion small geometry objects or more (requiring corresponding numbers of queries)—if not for the efficiencies realized by the subject system and method. Upon executing queries for small geometries for the topmost layer, corresponding pixels are preferably covered in a suitable cache. As an example, querying the top layer may result in 1.7 million out of the four millions of pixels being covered. Then, upon processing the next layer down, only 2.3 million queries are necessary (4 million-1.7 million). If processing that layer raises the total pixel coverage in the cache to 3.1 million out of the four million pixels, only 0.9 million queries (4 million-3.1 million) are necessary for the next lower level. The required number of queries per layer quickly decreases with the processing of successive layers in this manner.

For all the small geometry objects identified, only a portion of their geometry data is actually retrieved for use in locating and visually configuring an abstraction therefor in the image to be graphically rendered on the display area. This abstraction entails an alternate representation of a small geometry object by something other than its full geometric features (as would be defined by full retrieval and use of its geometry data). The abstraction preferably includes visual indicia of any suitable type, which may be more quickly and consistently rendered than the actual geometric features stored for the object. The rendering time savings for each small geometry object quickly multiply to significant levels considering the great numbers of objects typically found in many design layouts.

Once the small geometry objects have been 'collected' efficiently in this way, the large geometry objects (or, "big" objects) are collected more fully with their stored geometric features. In this regard, the layout database is queried in much the manner it is conventionally done. The system and method then generate a composite image containing both the large and small geometry objects. The large object geometries are represented in this composite image in their non-abstracted form as in conventional renderings, but the small geometry objects are represented in abstracted form—represented by designated visual marker or other suitable indicia rather than by their actual, fully-retrieved geometric features.

Figure 2:
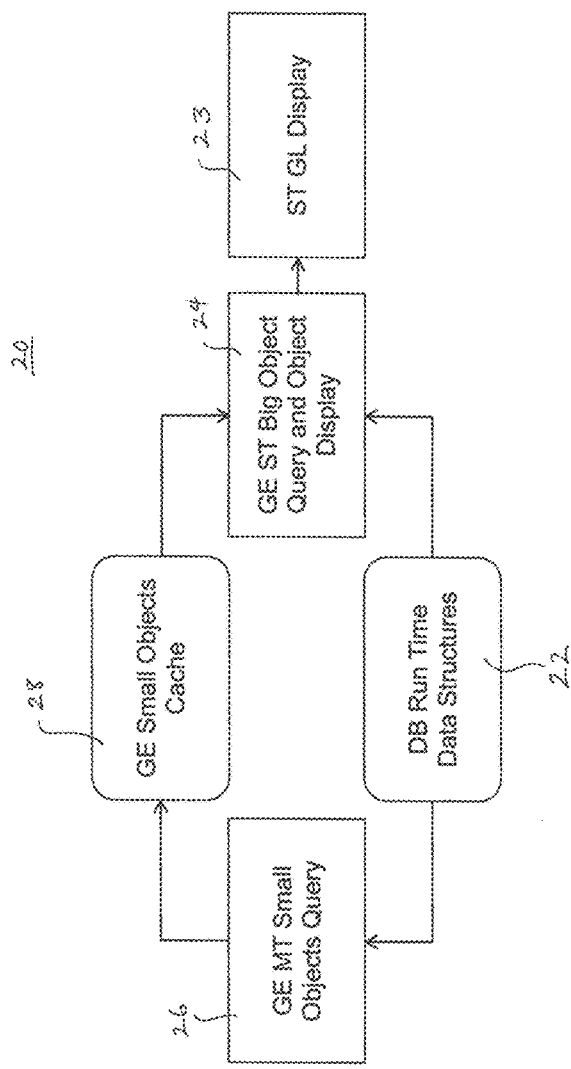
FIG. 2 is a schematic block diagram generally illustrating a functional interaction of main components in a system formed in accordance with one exemplary embodiment of the present invention.

Referring now to FIG. 2, a functional interaction of main components of a system 20 formed in accordance with one exemplary embodiment of the present invention is schematically illustrated. The components generally shown may be implemented using any suitable combination of software and hardware means known in the art for rendering a design layout on any suitable display 23. The display 23 defines a display area is defined in turn by an array of image pixels. The actual display image itself may be directly generated on a display screen or may be projected onto a different display surface, as is readily known in the art. The graphic rendering, however, is based on the combined actuation of the array, as is also readily known in the art.

The system 20 further includes, generally, a database unit 22 which maintains all the location and geometric data for the individual graphic objects that collectively make up a given design layout. While this database may be implemented in any suitable form known in the art, it is preferably implemented in a highly capable yet widely accessible format. The layout data in such formats are stored in highly compacted form, typically within hierarchy organized levels of circuit cell instantiations. The geometry data (including portions relating to the location of the given object within the design layout and the geometric features pertaining to that graphic object) may be retrieved, un-compacted, and delivered in response to appropriate queries from another unit.

This process is carried out typically by use of a suitable API for the given database type, as is readily known in the art. The details of such database formats and data access interface are well known in the art, such as disclosed for example in U.S. Pat. Nos. 8,413,087; 8,413,093; 8,453,091; 8,407,228, and the present invention is neither directed nor limited thereto. System 20 employs the object size filtering process and permits the full rendering of those graphic objects large enough in pixel span to pass the filter. Each large object is accordingly located within the given view of the design layout and the geometric portion of its geometry data is retrieved and used towards its graphic rendering. Instead of simply omitting those graphic objects small enough to be caught by the object filter as such, the geometry data for that object is partially retrieved. The processing-intensive burden of retrieving and rendering the geometric portion of the object's geometry data is avoided by retrieving and using just that minimal portion of the geometry data needed to identify the object's location within the design layout, (hence, its footprint or pixel coverage on the given view).

Towards these ends, the system 20 includes a big object query and control unit 24 as well as a small object query and display control unit 26. The big object control unit 24 operates much as in conventional systems, generating the appropriate big object queries and the subsequent rendering based on the full geometry data retrieved therefor. The small object control unit, 26, on the other hand, actuates a query for just that portion of each small object's geometry data sufficient to determine the object's location within the design layout and its pixel coverage on the given display area. The unit 26 executes the necessary API tools to query the database unit 22 accordingly. The unit 26 maintains one or more small object cache 28, populating the cache 28 with the location and pixel coverage information obtained from the database unit 22. Instead of the normal representation of each small object based on the geometric features defined by its geometry data, a predetermined small object indicia is provided for the display control measures (shown here for simplicity combined with the big object control unit 24) for display along with the big/large object geometries.

As described in following paragraphs, each of the small object cache 28 preferably maintains an array of pixel-based cells which are filled responsive to the small object queries to indicate whether or not individual portions of the display area corresponding to the pixel-based cell (or entry) are occupied by a small object or by a portion thereof. Each pixel-based cell maps to a marker cell on the actual display area. The marker cell may be defined according to the desired indicia resolution to encompass one display pixel or a number of grouped display pixels.

Figure 3:
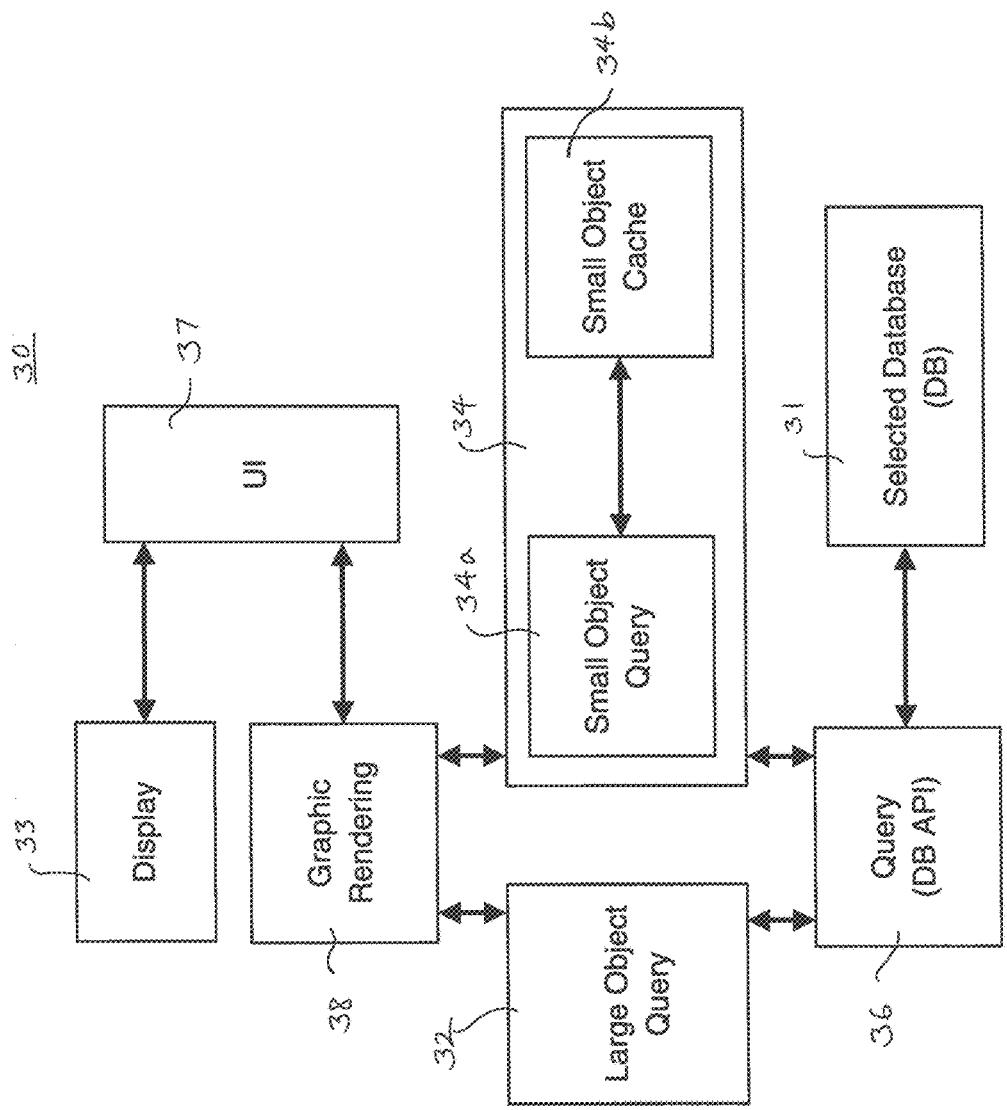
FIG. 3 is a schematic block diagram illustrating an intercoupling of functional modules in another exemplary system formed in accordance with one exemplary embodiment of the present invention, employing a database of predetermined format.

FIG. 3 schematically illustrates in greater detail the intercoupling of functional modules in another exemplary system 30 formed in accordance with illustrative embodiment of the present invention. System 30 includes a database 31 of predetermined format. This database is accessed through queries generated by a query module 36 executing one or more API's suitable for the database format. The query module is coupled to a large object module 32 and a small object module 34. These large and small object modules 32, 34 execute for the graphic objects of the given design layout alternatively classified as either large or small objects based upon such user-defined criteria as a filter size (object pixel span) parameter. The small object module 34 includes a small object query portion 34a which controls actuation of the query module 36 necessary to find and locate the small objects in the design layout and populate a small object cache portion 34*b* (also provided in the small object module 34) for appropriate placement in the view generated in the display area of the display module 33.

Each of the large and small object modules 32, 34 actuates through the query module 36 as needed to retrieve the appropriate portions of its objects' geometry data and accordingly drives a graphic rendering module 38 to generate a composite image containing the geometries of the large objects present in the given view and appropriate visual indicia for those small objects which would be visible in the view. The graphic rendering module 38 provides the composite image to a display module 33 which is driven to display the same in its display area.

The predetermined indicia for the small objects included in the composite image are visually represented by actuating the pixels within respective marker cells of the display area (of the display module 33) according to the pixel-based cell entries of the global array maintained in the small object cache 34*b*. Each occurrence of the predetermined indicia may encompass one or more marker cells in the display area, and may be visually indicated for example by setting each pixel(s) of its marker cell(s) to a preselected color.

System 30 also includes a user interface 37 by which a user communicates with the display module 33, graphic rendering module 38, and any other module as necessary. Preferably, the user interface module 37 generates a graphic user interface which presents various user interface screens by which to enter input and output various control settings, design layout data, or the like.

Figure 4:
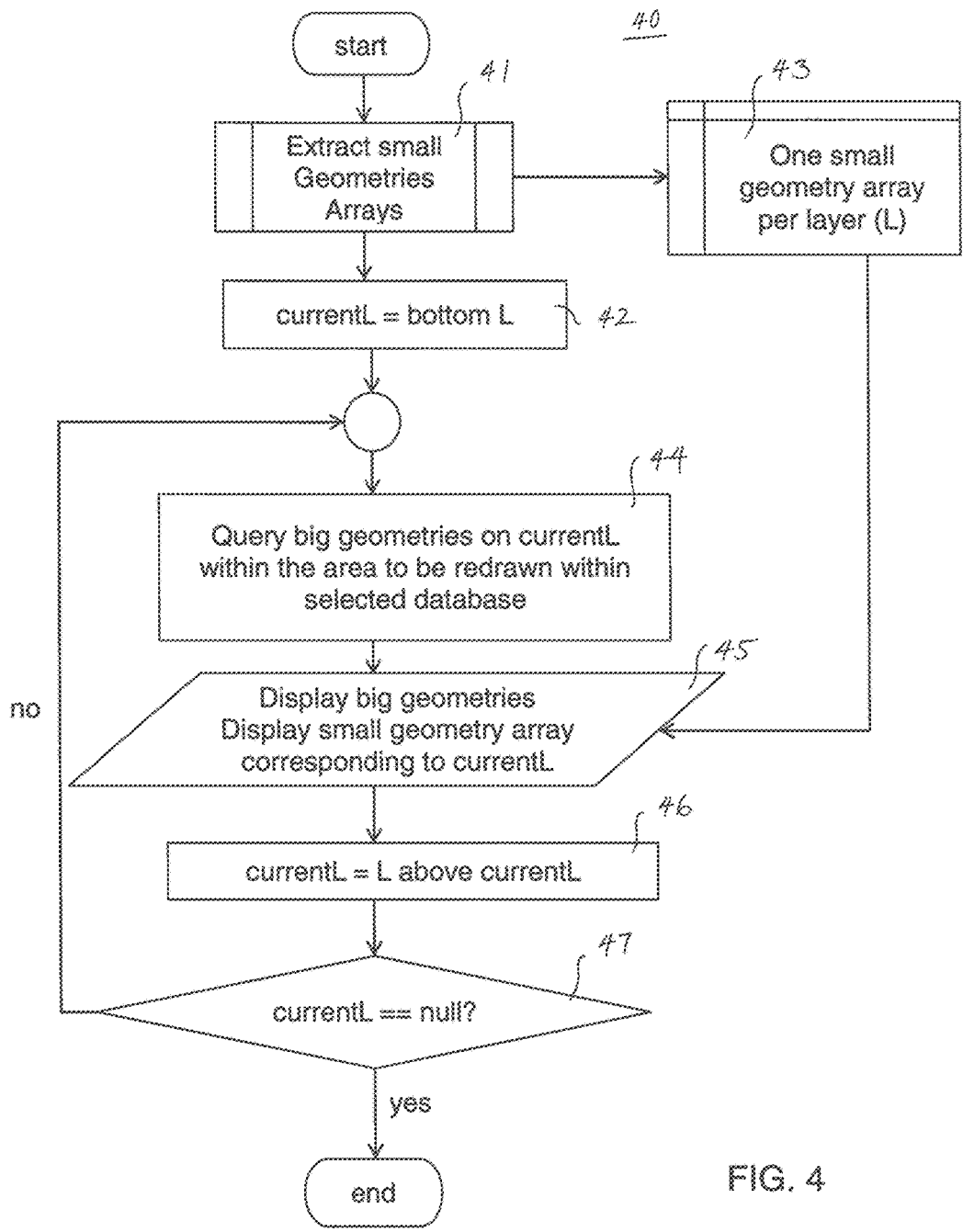
FIG. 4 is a flow diagram illustrating a general flow of processes carried out in a particular implementation of the embodiment of FIG. 3.

FIG. 4 schematically illustrates a general flow 40 of processes carried out by a particular implementation of system 30 in accordance with an exemplary embodiment of the present invention. In this case, the design layout is of multi-level structure having a plurality of predefined layout layers (with each layer separately denoted L in the FIGS.). Process 40 (like the processes 41, 426 described in following paragraphs) is preferably executed by one or more processors suitably programmed and implemented in one or more functional modules of the system 30. The collective flow of processes is cooperatively carried out by such processing measures provided for the various functional modules of system 30, as illustrated in FIG. 3.

At block 41 of the process 40, one or more layout arrays are extracted for objects having small geometries. For a multi-level, or multi-layered, design layout, at least one local array is maintained at block 43 for each layer L to keep track of any small geometry object that may be present on that layer. Each local array is preferably defined as an array of pixel-based cells whose entries (or values) indicate whether or not a small object (or a portion thereof) has been found at a corresponding location in its layout layer. The array of pixel-based cells maps to the array of marker cells (each encompassing one or other selected number of pixels) collectively defining the display area of the given display module.

As indicated at blocks 42 and 44, the layout database is queried for big geometry objects, iteratively for each layout layer L. In the illustrated case, this preferably though not necessarily starts from the topmost layer L. More precisely, the query is carried out for those big geometry objects residing on each of the layout layers, and within the area of the design layout to be viewed (that is, falls within the view shown on the display area of the display module). At block 45, the geometry data for the big objects and the visual indicia defined by the local arrays for the respective layers are combined to generate a composite image at block 45 for each layout layer. As blocks 46 and 47 show, this generation of a composite image by querying the layout database for big objects and supplementing the retrieved big object geometries with the indicia for small objects from the corresponding layout array (from the small object cache) is carried out iteratively for each layer L.

The layout database queries may be made in any suitable manner known in the art for the database format employed. With a widely accessible database such as employed in the illustrated embodiment, interaction with the database is made through appropriate API's. For example, an area query may be effected by making direct calls to a suitable region query API as follows: (in one specific example)

Query big geometries on current L within the area to be redrawn within the predetermined database?
Any small geometry on current L within currentL1Partition?
Any small geometry on current L within current L2Partition?
Any small geometry on current L within globalArrayBox?

Since certain database objects within a currently zoomed-in area are to be redrawn, calls to a database region query API may also be made. When doing so, the calling module gives to the region query API a bbox parameter of the currently zoomed-in area. The database's region query API then executes to return the list of objects within that bbox.

The calling module may also give other arguments to the region query API. For example, when redrawing the small objects, the calling module may tell the region query API the maximum size of the objects that should be returned. The region query API then responds by returning only those objects smaller than the designated maximum size. When redrawing the small objects, the calling module may tell the region query API the minimum size of the objects that should be returned. The region query API then responds by returning only those objects bigger than the designated minimum size.

Figure 5:
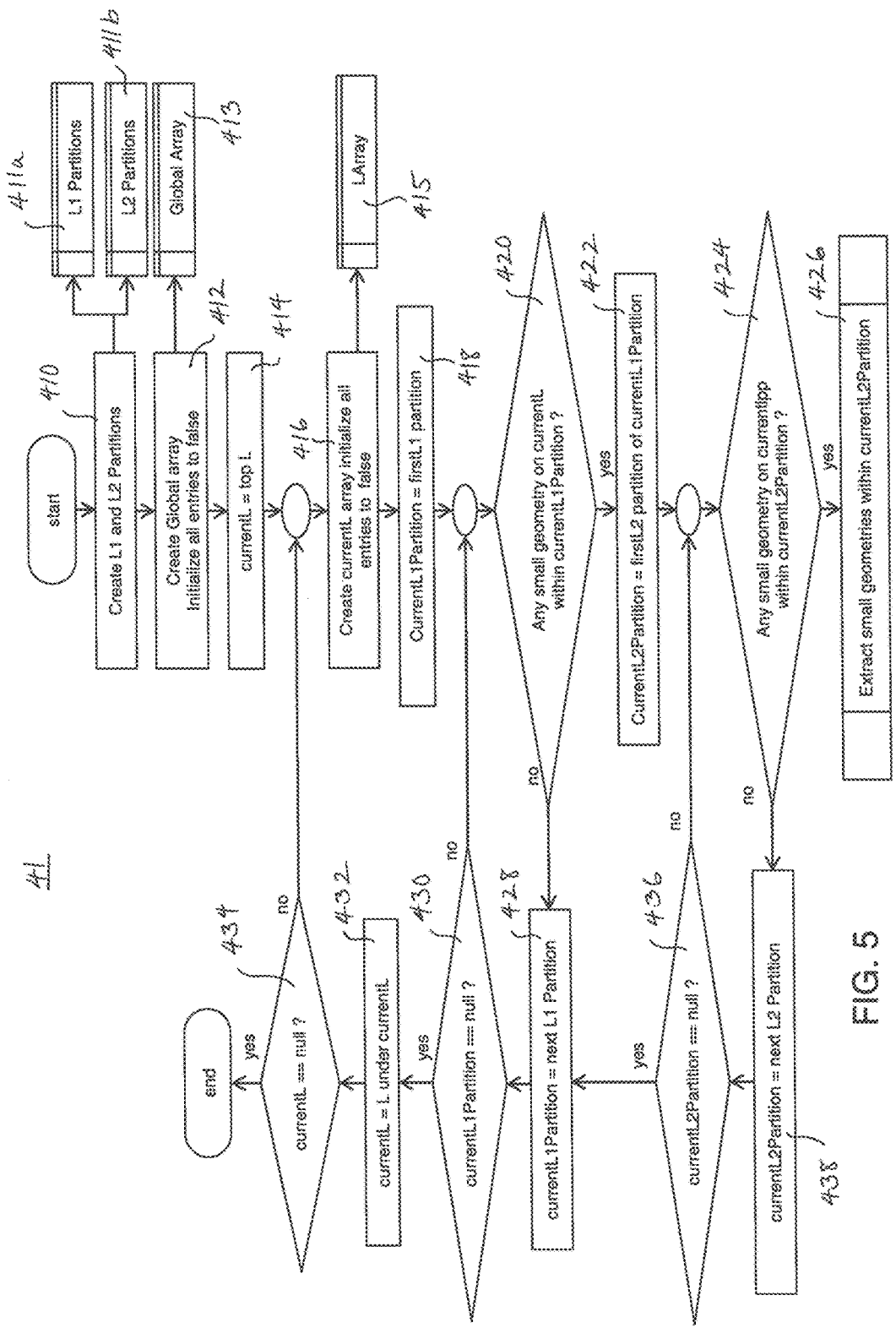
FIG. 5 is a flow diagram illustrating in more detail a general flow of processes carried out within a portion of the flow diagram shown in FIG. 4.

FIG. 5 illustrates in more detail the flow of processes occurring within block 41 of FIG. 4, in accordance with one exemplary implementation. As shown, at least one array of pixel-based cells is extracted for small geometry objects. The process of extracting such small object arrays starts with queries of the database to find the occurrence of small objects at the array's pixel-based cells. To heighten the efficiency of this search process, the flow of processes 41 illustrated in this particular embodiment generates coarse and fine partitions L1, L2 of the pixel-based cells, as indicted at blocks 411*a* and 411*b*. In this case, a global array 413 is created at block 412, with the entries of its pixel-based cells filled with Boolean values. The entries are each preferably initialized to a Boolean FALSE value.

An iterative process is then started at block 414 starting from the topmost layout layer L to create and initialize the local arrays 415 for each layout layer at block 416. The entries of each layer's local array are likewise initialized to a Boolean FALSE value. At block 418, a search for small geometry objects is begun at each of the coarse L1 partitions 411*a*. Each coarse partition encompasses a preselected number of cells that exceeds the number of pixel-based cells encompassed by each of the finer L2 partitions 411*b*. A check is made at block 420 for any small geometry objects within the current L1 partition of the current layout layer's local array. If so, the finer L2 partitions within the current coarse L1 partition are each checked for the presence of a small geometry object at blocks 422 and 424. If no small object is found for a fine L2 partition, the next fine L2 partition is checked at block 438 until all the fine L2 partitions are exhausted, as indicated at block 436.

Once all the fine grid partitions L2 are exhausted for the given coarse grid L1 partition, the next coarse grid L1 partition is checked for a small geometry object at block 428, unless all the coarse grid L1 partitions are exhausted, as indicated by the check at block 430. If not exhausted, each of the remaining coarse grid L1 partitions is also checked for the occurrence of a small geometry object at block 420. For any coarse grid partition L1 having a small geometry object, the iteratively-looped check of its fine grid L2 partitions of blocks 422, 424, 438, 436 is carried out.

Figure 6:
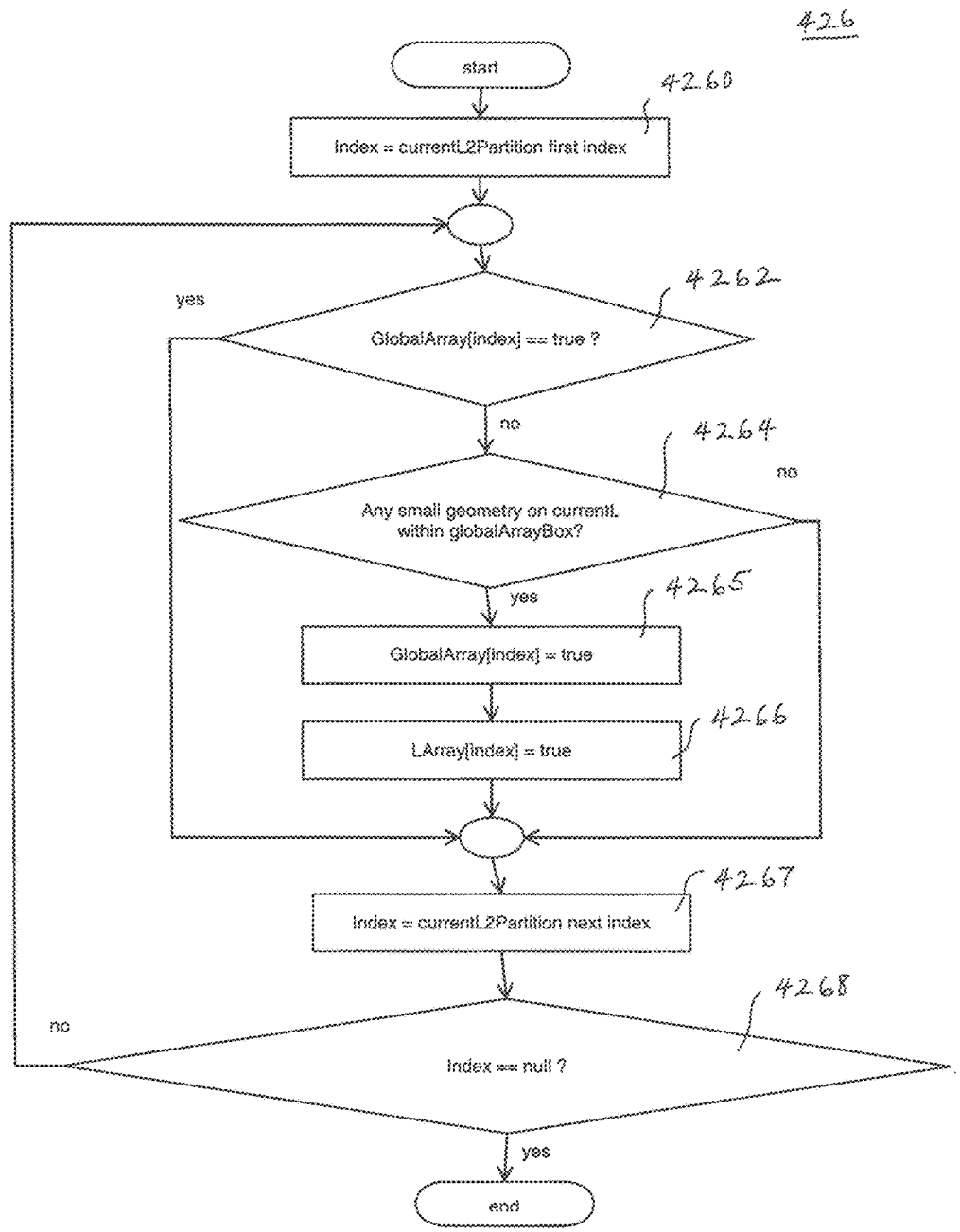
FIG. 6 is a flow diagram illustrating in more detail a general flow of processes carried out within a portion of the flow diagram shown in FIG. 5; by a particular implementation of the embodiment of FIG. 3.

Whenever a small geometry object is located within a fine grid L2 partition at block 424, all small geometries within that partition are extracted (see FIG. 6). The appropriate pixel-based cell of the local array and the same cell of the global array are updated according to the partial geometry data retrieved for such small object. Once all the coarse grid L1 partitions are exhausted at block 430, flow proceeds to the next layout layer L at block 432, and the preceding check of the coarse and fine grid partitions L1, L2 for that layer are repeated. This process continues until all the layout layers have been checked and exhausted, as indicated at block 434.

FIG. 6 illustrates in more detail the flow of processes occurring within block 426 of FIG. 4, in accordance with one exemplary implementation. As shown, an index is set at block 4260 to the current fine grid L2 partition. At block 4262, a check is made to determine if the global array cell entry (or entries) for the currently indexed L2 partition is already set to a Boolean TRUE value. A TRUE value is taken in this example as an indication that this pixel-based cell at another layout layer has already been found to contain at least a portion of a small geometry object, and the local and global arrays accordingly updated already. In that case, the flow skips directly to block 4267, where the index is set to the next fine grid L2 partition, and the check of block 4262 again made for that index. This occurs until the all fine grid L2 partitions for the current course grid L1 partition have been exhausted, as indicated by the check at block 4268.

If at block 4262, the global array cell entry (or entries) for the currently indexed fine grid L2 partition is still at its initial FALSE value, the flow proceeds to block 4264, where a check is made for a small geometry at each cell within the currently indexed L2 partition. If a small geometry is found, the global array entry for the given cell is set to TRUE at block 4265. The matching local array cell entry for the current layout layer is likewise set to TRUE at block 4266. After all the cells of the currently indexed L2 partition (not previously identified as containing a small geometry) have been checked, the index is thereafter set to the next fine grid L2 partition at block 4267, and the process repeated for that partition. This continues iteratively until all L2 partitions for the current course grid L1 partition are checked for a small geometry object.

While only two levels of partitions L1 and L2 are illustrated in this example, additional levels of partitions may be employed depending on the particular requirements of the intended application. For instance, sequentially graduated levels of course grid partitions L1 may be employed until the fine grid partition L2 is reached.

Figure 7A:
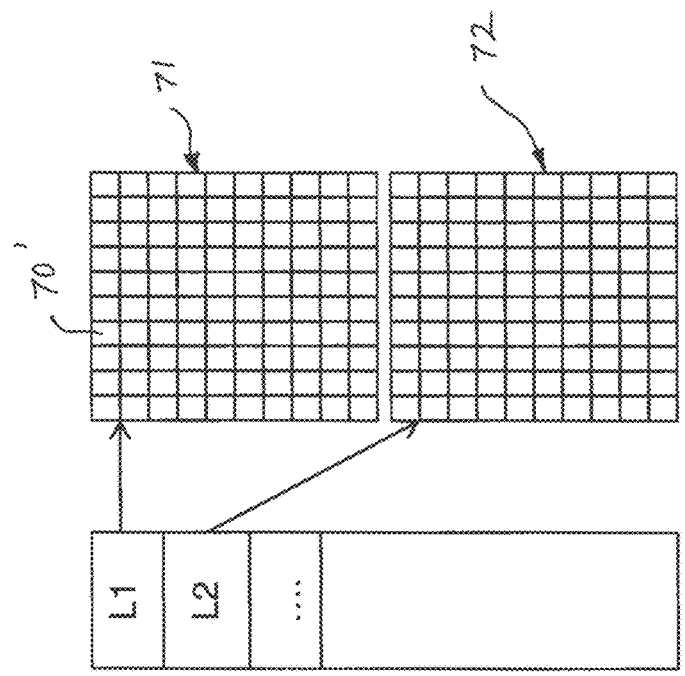
FIGS. 7A and 7B are schematic diagrams comparatively illustrating local arrays defined for high and low resolution configurations within a small object cache employed in the embodiment of FIG. 3.
Figure 7B:
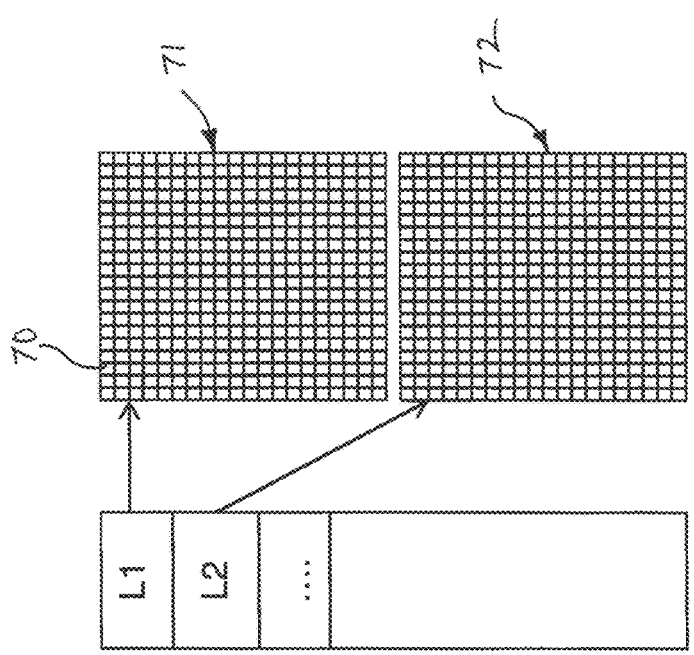

The small object cache preferably stores the extracted small object data for a multi-layered design layout as a vector of Boolean local arrays, as illustrated in FIGS. 7A, 7B. Each component of the vector effectively corresponds to a redrawn layout layer L, where each L represents extracted small object data on an array of pixel-based cells which map respectively to corresponding cells on the display area to be viewed. FIG. 7A illustrates a high resolution case where each of the pixel-based cells 70 of the local Boolean array 71, 72, . . . for each layout layer L1, L2, . . . corresponds to one display pixel (each marker cell in the display area then encompassing but one display pixel). FIG. 7B alternatively illustrates a lower resolution case where each of the pixel-based cells 70' of the local Boolean array 71, 72, . . . for each layout layer L1, L2, . . . encompasses a group of four display pixels (each marker cell in the display area also encompassing four display pixel). Preferably, each cell of the Boolean arrays is initialized to a FALSE value.

A global Boolean array is maintained for the set of local arrays pertaining to a design layout view. As described in preceding paragraphs, every small object extraction indicated in at least one of the local arrays of the design layout view is likewise reflected in the global array. The global array thus accumulates all occurrences of a small object in any of the layout layers to collapse all the small object-occupied pixel-based cells at each of the layers down to one composite locus of all such occupied cells, regardless of layer. Since a pixel-based cell occupied at on one layer aligns with the same cell in other layers, that cell on the global array need only be filled once, and redundant filling may be avoided. Consequently, the small object query and local array filling process for each of the layout layers L may be preferably streamlined by skipping even a query for any cell already filled in the global array (indicating prior filling in another layer's local array). To further enhance efficiency, where a small object query for a cell indicates that a small object occupying that cell spans more than just that one cell, the other cells into which the small object extends may also preferably filled automatically to indicate occupation and skipped over for further query at any layer L.

Figure 8A:
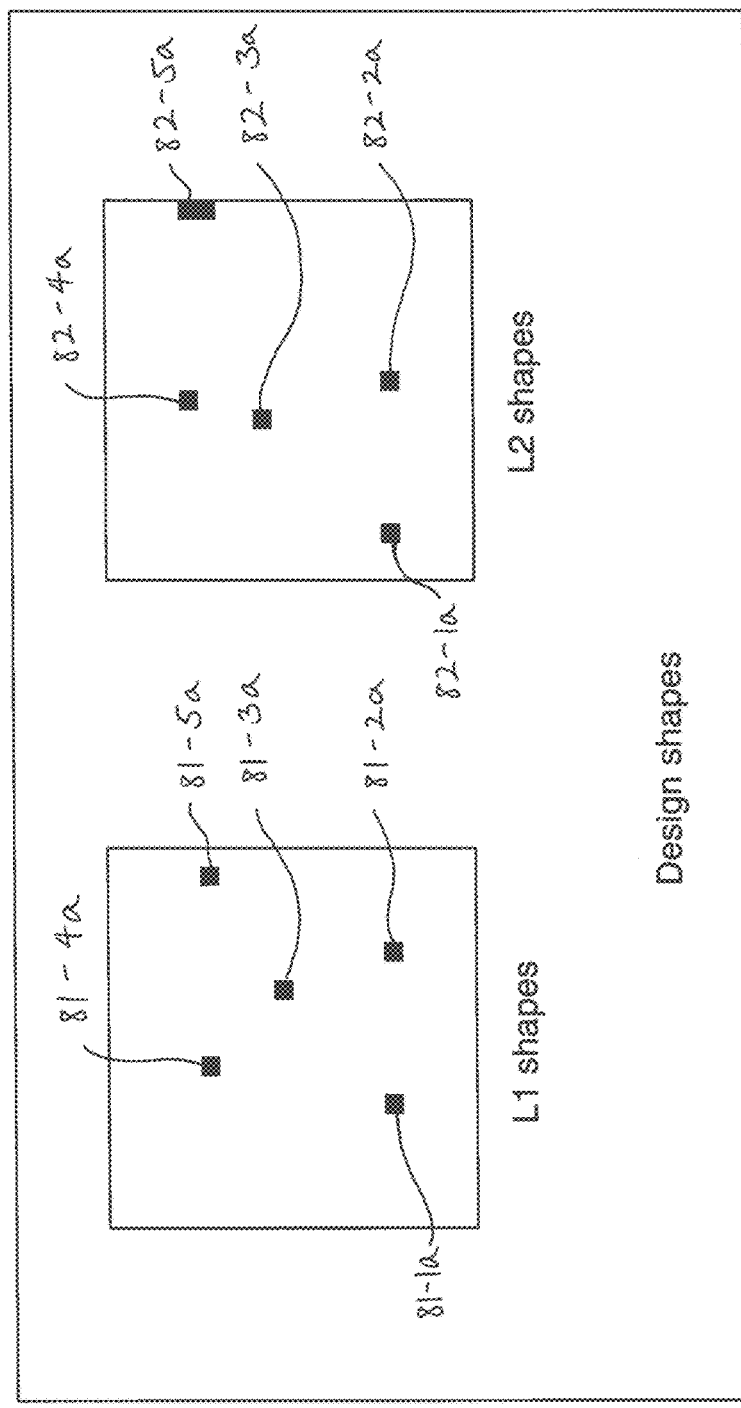
FIG. 8A is a schematic diagram illustrating samples of geometric shapes for small objects located on different layout layers a multi-layered design layout.
Figure 8B:
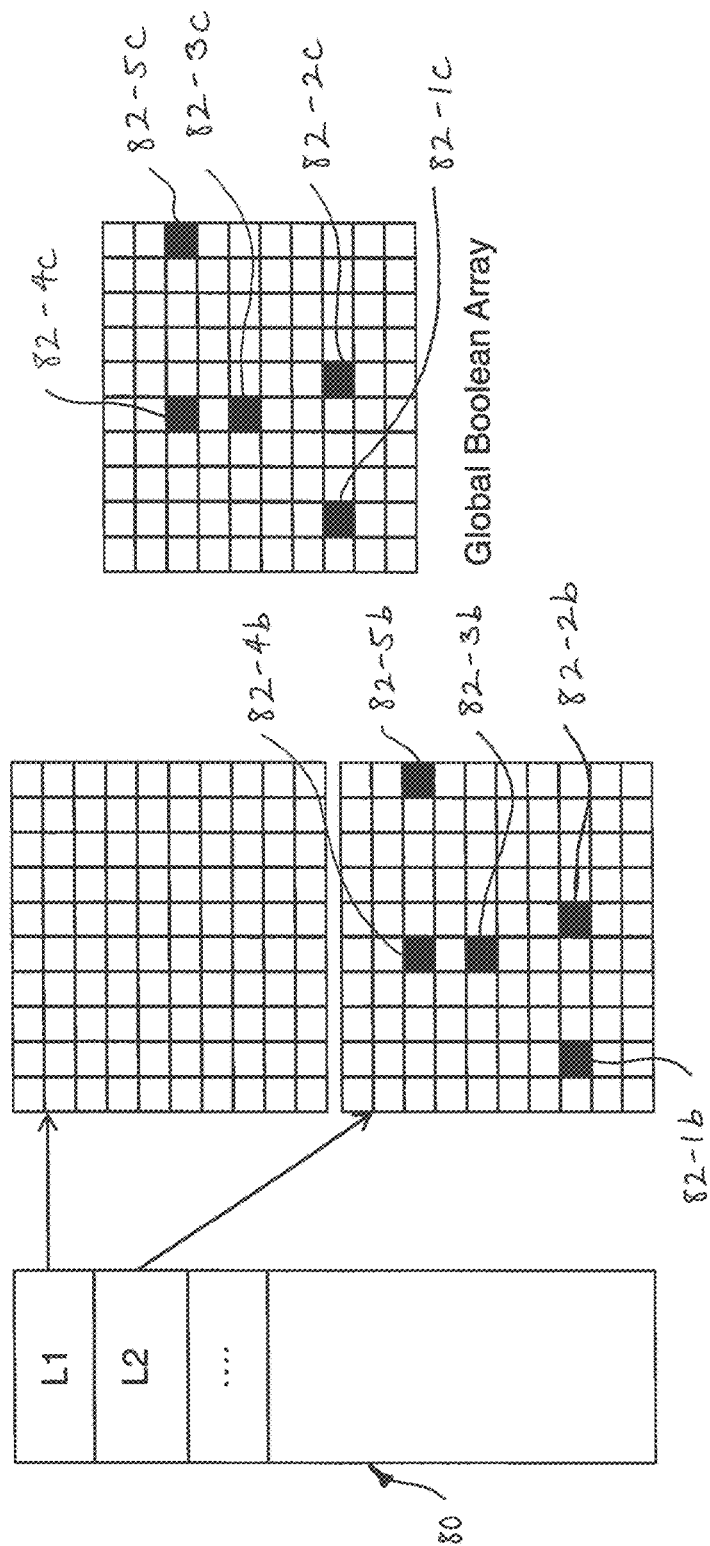
FIGS. 8B and 8C are schematic diagrams comparatively illustrating the filling of different layout layers' local arrays and a global array within a small object cache employed in the embodiment of FIG. 3, for the shape samples illustrated in FIG. 8A.
Figure 8C:
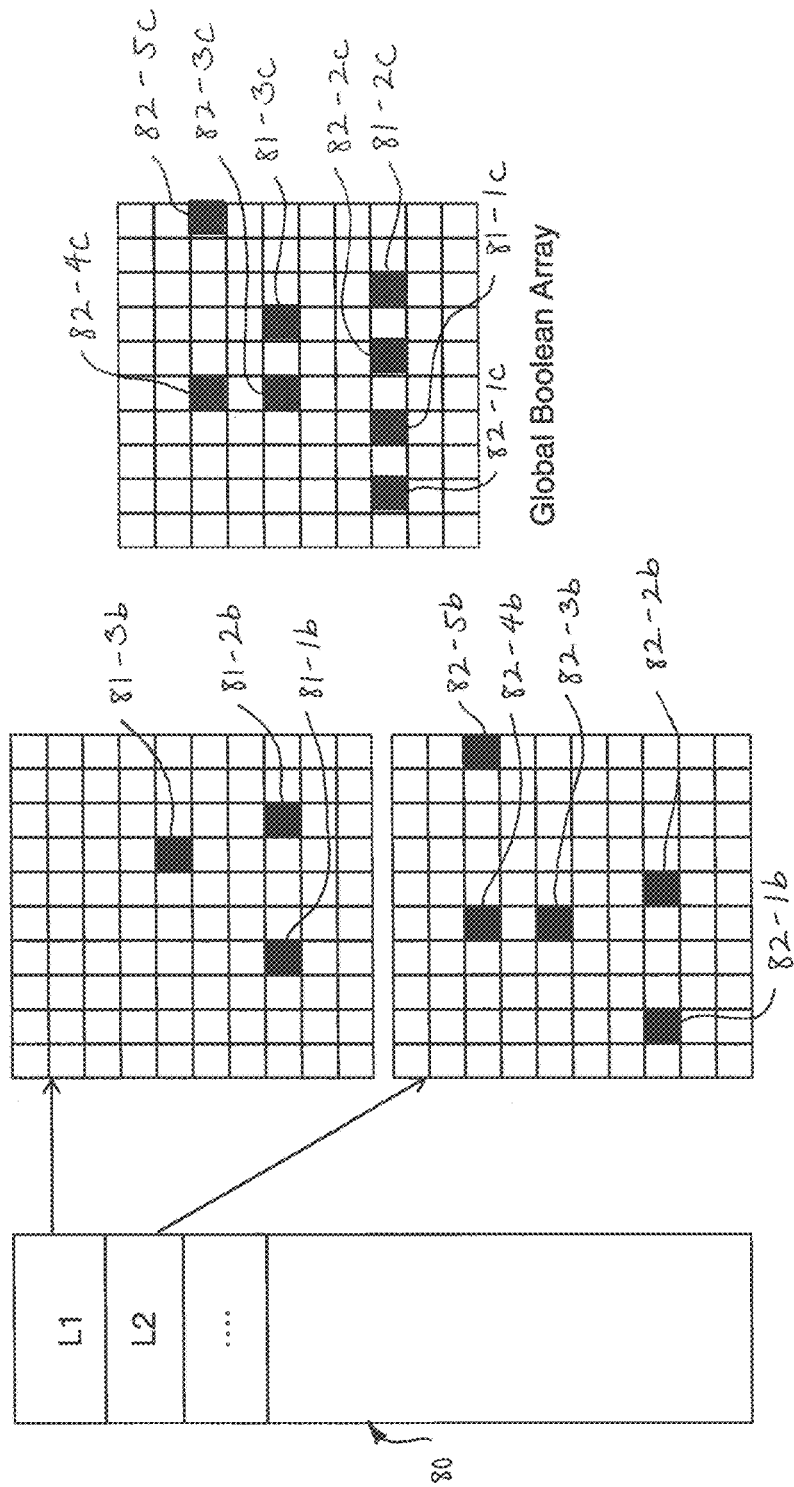

FIGS. 8A-8C schematically illustrate an example of a process for filling the local and global arrays in the disclosed implementation of system 30. FIG. 8A illustrates samples (in a highly simplified case) of geometric shapes for small objects located on different layout layers L1, L2 of a multi-layered design layout 80 (shapes 81-1a, 81-2a, 81-3a, 81-4a, 81-5a located on layout layer L1 and shapes 82-1a, 82-2a, 82-3a, 82-4a, 82-5a on layout layer L2). For simplicity of illustration, all but one (82-5a) of the shapes here each occupy just one pixel of the given display area. As illustrated in FIGS. 8B-8C, the small object cache is preferably filled by sequential queries for small objects through the various layout layers L. For each layer L, the query is made for each not yet filled cell of its local array (representing a single display pixel, or a group of display pixels), a cell-wide area query is actuated, which aborts as soon as an object smaller than the queried area in at least one dimension is returned. The cell is then set to Boolean TRUE in that local array, as well as in the global array.

This is shown in the illustrated example for layout layer L2, with its local array being filled with entries 82-1b through 82-5b to represent on the array shapes/objects 82-1a through 82-5a. The global array is likewise populated with the corresponding cells being filled by the entries 82-1c through 82-5c. A subsequent query for small objects on layout layer L1 is carried out. But for this layer the entries 81-1b, 81-2b, and 81-3b for only three of the five shapes/objects 81-1a through 81-5a are made in corresponding cells of the L1 local array. This is since the other three shapes 81-4a and 81-5a coincide in cell location with shapes 82-4a and 82-5a of the layer L2, which have already been filled on that layer's local array (and on the global array), they are neither queried for nor filled again for the current layer L1. The global array is again updated accordingly for this layer L1, with the entries 81-1c, 81-2c, and 81-3c filling the corresponding cells to supplement the other entries previously made for the layer L2.

Figure 9A:
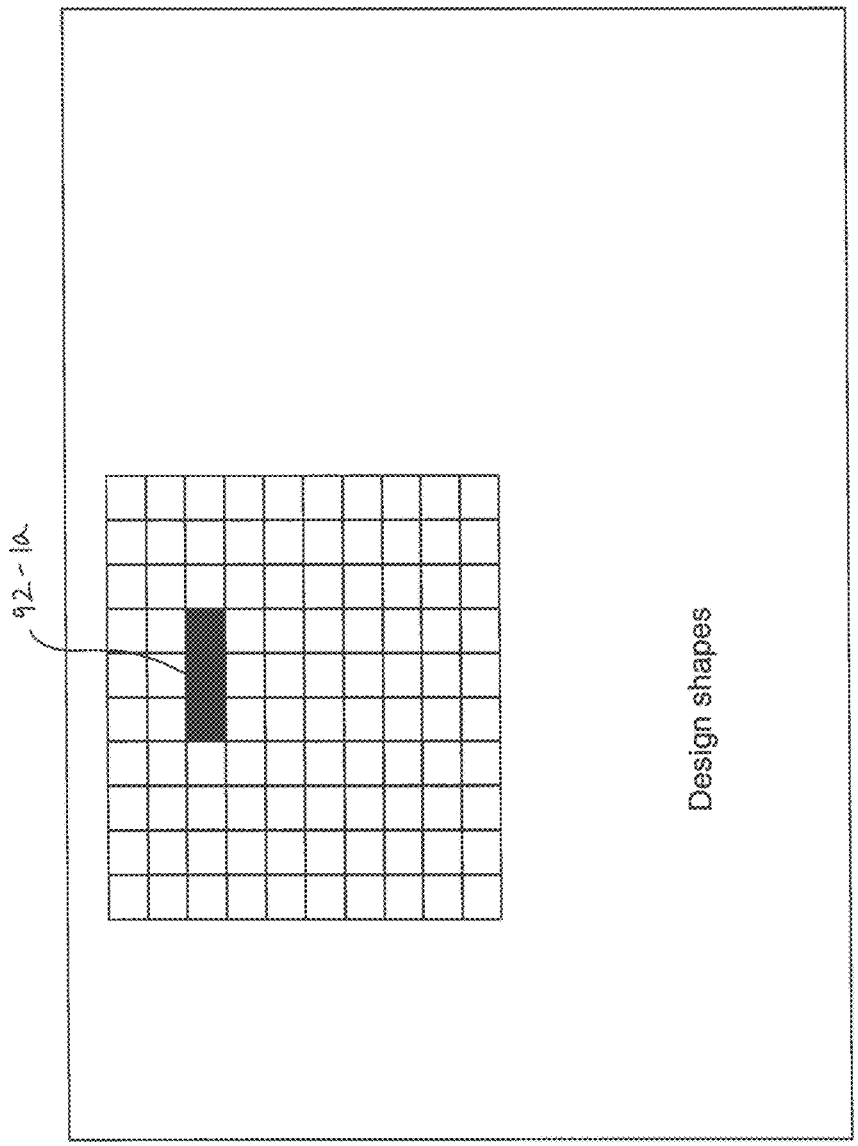
FIG. 9A is a schematic diagram illustrating a sample of a geometric shape long enough to occupy multiple pixels along at least one reference dimension.

Occasionally, a small object returned by the layout database area query may be larger than one pixel (or one group of pixels). This is illustrated in FIGS. 9A-9B, where a shape/object 92-1a of layout layer L2 is long enough in one dimension to occupy three pixels. In this case, an L2 query carried out upon reaching a cell of the L2 local array corresponding to one pixel covered by the object 92-1a returns a small object shape indicating the shape's three-pixel span. A Boolean TRUE entry is then made on the L2 local array for not only that one cell, but also for the two other neighboring cells, such that the entry 92-1b correspondingly spans three cells. The global array is likewise updated with the entry 92-1c spanning three cells.

As described in preceding paragraphs, efficiency may be further optimized by avoiding unnecessary queries of areas on a given layout layer L devoid of any small geometry objects. Running pixel-based queries tends to be considerably slower in certain layout databases than running larger area queries. Thus, suitable partitioning measures are preferably employed to quickly traverse different partitioned areas of each design layout layer to detect the occurrence of small geometries in that larger partitioned area, then running the finer cell-by-cell (pixel-wide, or pixel group-wide) area queries in only those partitioned areas of the database actually confirmed to contain a small object. The coarse grid and fine grid partitioning similar to that earlier described in is illustrated in FIGS. 10A-10B, with a grid split factor of two (2). Other split factors may be employed to effect different course/fine partitioning ratios to suit the particular requirements of the intended application.

As schematically illustrated in FIG. 10A, a local array for a layout layer (such as the L1 or L2 layers illustrated in FIGS. 8A-8C) is partitioned to define a coarse grid—of four quadrants in this example. A partition-by-partition large area query of the layout database returns small objects 10-1 and 10-2 (each of occupying just one pixel) within the top two quadrants. Further queries based on finer grid partitioning are carried out within these top two quadrants until it is determined that the top left and bottom right quadrants of the partition 10b contain the small objects 10-1 and 10-2. Pixel-based queries of just these two quadrants within the partition 10b then locates the small objects within their corresponding pixels, and the local and global arrays are accordingly updated with TRUE entries at the corresponding cells.

Figure 10C:
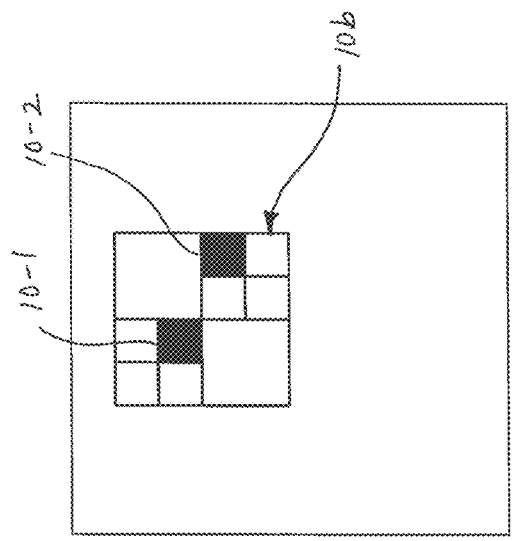
FIGS. 10A-10C are schematic diagrams sequentially illustrating a partitioning process for optimizing a query process for small objects corresponding to local array cells in certain implementations of the embodiment of FIG. 3.
Figure 10B:
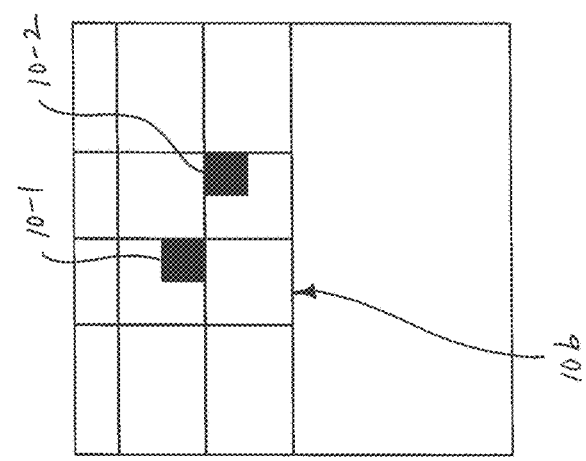
Figure 10A:
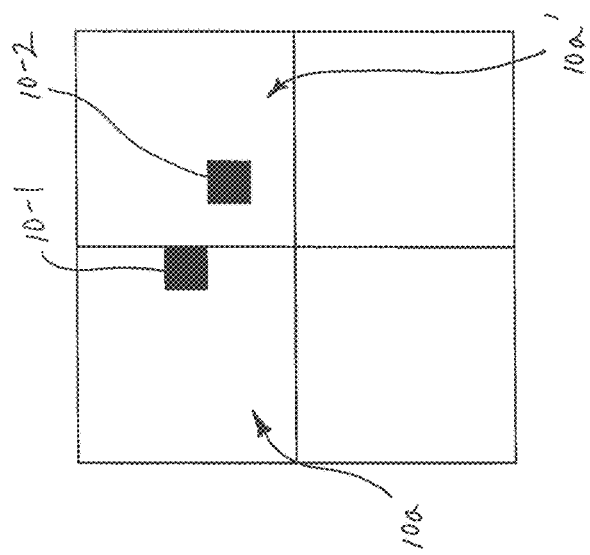

FIGS. 11A-11C schematically illustrate a slight modification of the partitioned query approach illustrated in FIGS. 10A-10C. In this example, the quadrants 11a, 11b of partition 10b which contain the same small objects 10-1 and 10-2 are each further partitioned. No pixel-based query is carried out in the upper partition half 11a' of the quadrant 11a, since the small object 10-1 is contained in the bottom partition half 11a". Pixel-based queries are then carried out only in that lower half of the quadrant 11a, including a query for the pixel-based cell at the area 11c. The other quadrant 11b containing the small object 10-2 similarly undergoes further partitioning before pixel-based queries are made therein. In addition to reducing the number of pixel-based queries, this successively partitioned approach is found to actually reduce the total number of queries (large or small area-based) carried out.

Test implementations of system 30 reveal typical graphic rendering times for a composite image of the design layout sample of FIGS. 1A-1B of approximately 12-15 seconds, as opposed to the approximate 150 seconds for full geometric rendering of all objects (such as illustrated in FIG. 1A). This is with single thread operation. Configuring the system for multi-threaded operation, with 10 or 12 threads parallelizes the pixel-based queries, for example, reduces the composite image rendering times down to about 1 or 2 seconds.

While pixel-based queries may be readily parallelized using various suitable multi-threading measures known in the art, different areas of a design layout are normally not populated evenly with small shapes. Hence, simply dividing the global area of a design layout into N partitions, and querying those partitions in parallel with N threads for a given L does not necessarily yield optimal results. The sparsest partition will be the bottle neck.

A more preferable approach is to divide the design layout into M partitions (where M is much bigger than N, the number of threads). A pool of N threads are then applied to cooperatively process each of those M partitions until all partitions are processed. While this requires the common use of one mutual exclusion object (mutex) to ensure synchronous access, it provides proper balancing of the multi-threaded queries.

Figure 12:
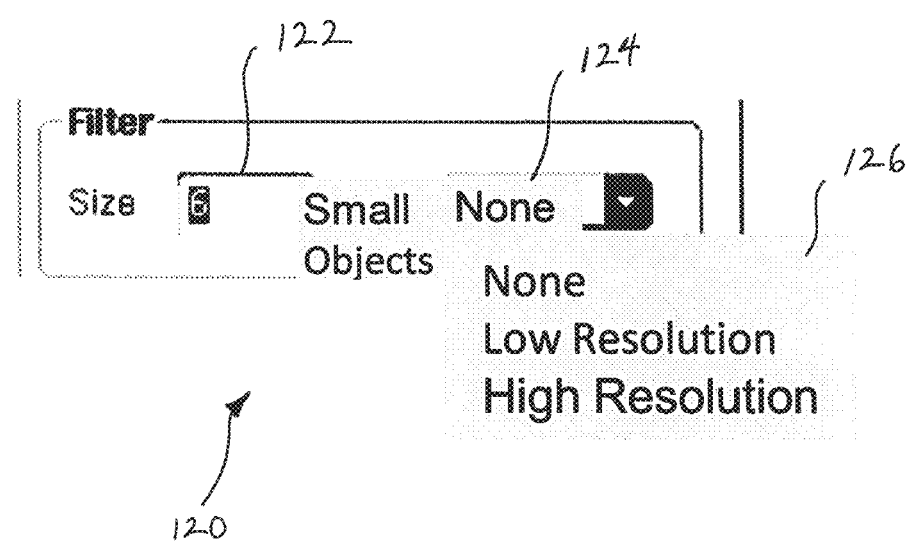
FIG. 12 is a graphic representation of one example of a configuration select portion for a graphical user interface generated in a particular implementation of the embodiment of FIG. 3.

FIG. 12 illustrates one example of a configuration select portion 120 for a graphical user interface programmably implemented by system 30 in accordance with an exemplary embodiment of the present invention. The interface portion 120 in this example provides various display control options in the form of parameter values which the user may selectively set. The control options include a setting 122 for the filter size value (set to a default value of 6 in this particular example). The control options also include a setting 124 for activation of the small object abstraction measures as disclosed herein. In this particular example, a drop down presents "None," "Low Resolution," and "High" (resolution) options for the user to select from. Selecting the "None" option simply deactivates the small object abstraction operation altogether, such that graphic objects in the view to be rendered below the filter size setting are not displayed. Selecting the "Low Resolution" option activates the small object abstraction, and configures the system to represent small object indicia in the composite image with a lesser of certain pre-set pixel resolutions. Selecting the "High" (resolution) option also activates the small object abstraction, but alternatively configures the system to represent small object indicia in the composite image with a greater of the certain pre-set pixel resolutions.

FIG. 12 illustrates but one of numerous examples for user interface window which may be employed in system 30. The actual make up and configuration of such interface may vary considerable, depending on the particular requirements of the intended application.

Figure 13:
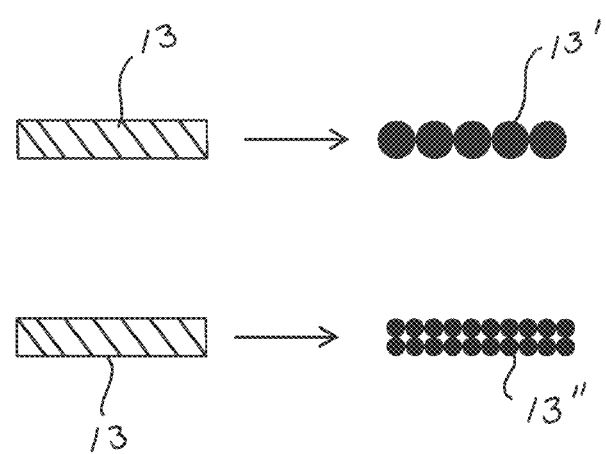
FIG. 13 is a schematic diagram comparatively illustrating indicia alternatively representing a given small object in low and high resolutions.

One comparative example of indicia alternatively representing a given small object 13 in low and high resolutions is shown for illustrative purposes in FIG. 13. In this particular case, the small object 13 is of laterally elongated shape geometrically defined by various geometric features (rectangularly contoured with internal cross-hatching) is abstracted in the first instance to a low resolution indicia 13' formed by activating 5 consecutive pixels to illuminate at a predetermined color. In the second instance, the same small object 13 is abstracted to a high resolution indicia 13' formed by activating a 2×10 array of 20 total pixels to illuminate at a predetermined color.

FIG. 14A illustrative compares the flexibility of configuration display control options afforded by a conventional layout editing/viewing implementation IC A and a comparable implementation IC B incorporating system 30. In order to include in the graphically rendered view representations of all graphic objects in that view, a 0 or null filter size value must be set with the conventional system IC A. With system IC B, all the graphic objects (large and small) are included in the graphically rendered view, even with the filter size value set for example at 5—although the small objects are rendered in indicia-abstracted form. Preferably, system IC B also makes available at least one high and at least one low resolution display options for the abstracted small objects. This option is not even applicable to the conventional system IC A.

Since objects of less than 5 pixels in all reference dimensions are typically not discernible on most displays (for average levels of user optical acuity), display features of small objects for filter size settings of 1-4 are normally not of concern. For filter size settings greater than the 5 value shown, system IC B would continue to include along with the large objects in a composite image for view abstracted versions of all small objects, whereas the conventional system IC A would exclude increasingly more objects from view.

FIG. 14B similarly illustrates a comparison of configuration display control options afforded by the conventional system IC A and a comparable implementation IC C incorporating system 30. System IC C in this example is identical to system IC B, but permits the lower filter size settings 1-4. Both high and low resolution options are preserved for small object indicia at each filter size setting.

Figure 15:
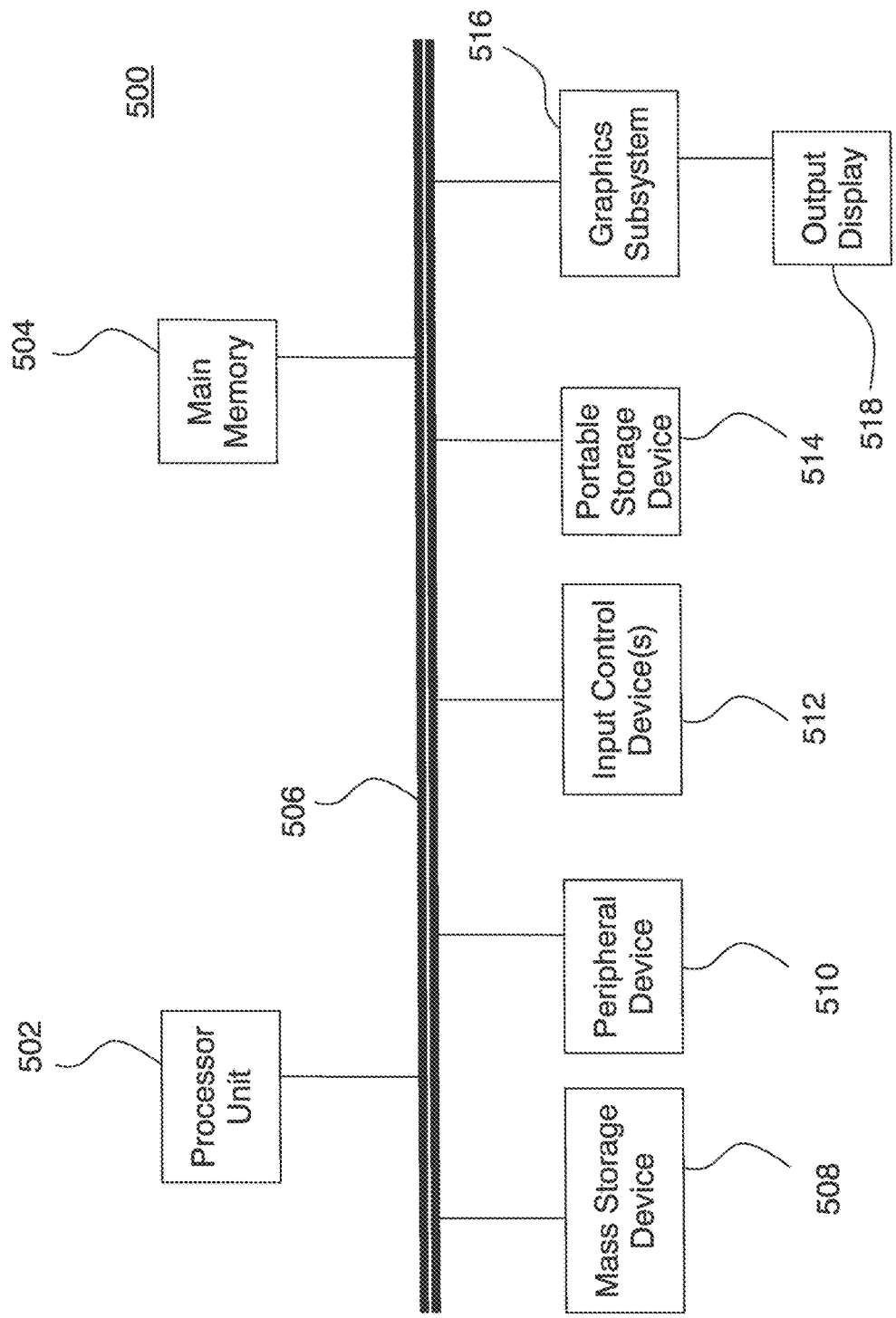

FIG. 15 illustrates a block diagram of an exemplary computer system which may be employed to implement various embodiments in accordance with the present invention. The illustrative computer system 500 includes a processor unit 502, a main memory 504, an interconnect bus 506, a mass storage device 508, peripheral device(s) 510, input control device(s) 512, portable storage drive(s) 514, a graphics subsystem 516, and an output display 518. Processor unit 502 may include a single microprocessor or a plurality of microprocessors for configuring computer system 500 as a multi-processor system. Main memory 504 stores, in part, instructions and data to be executed by processor 502. Main memory 504 preferably includes banks of dynamic random access memory (DRAM) as well as high-speed cache memory.

For simplicity, the components of computer system 500 are connected via interconnect bus 506. However, computer system 500 may be connected through one or more other data transport measures of any suitable type known in the art, both wired and wireless. For example, processor unit 502 and main memory 504 may be connected via a local microprocessor bus and mass storage device 508, peripheral device(s) 510, portable storage medium drive(s) 514, and graphic subsystem 516 may be connected via one or more input/output (I/O) buses. Mass storage device 508, which may be implemented with a magnetic disk drive, an optical disk drive, a solid state device, or an attachment to network storage, is non-volatile storage device for storing data, databases, and instructions, to be used by processor unit 502. In a software embodiment, mass storage device 508 may store the software to load it into main memory 504. Mass storage device 508 may include any form of non-transitory computer readable media and may include multiple forms of different media.

Portable storage medium drive 514 operates in conjunction with a portable non-volatile storage medium such as a floppy disk, a compact disk read only memory (CD-ROM), a digital versatile disk read only memory (DVD-ROM), or a memory card such as e.g. Secure Digital High Capacity (SDHC), to input and output data and code to and from the computer system 500. In certain embodiments, the software is stored on such a portable medium, and is input to computer system 500 via portable storage medium drive 514. Peripheral device(s) 510 may include any suitable type of computer supported device known in the art, such as an input/output (I/O) interface, to add additional functionality to computer system 500. For example, peripheral device(s) 510 may include a network interface card to interface computer system 500 to a network.

Input control device(s) 512 provide a portion of the user interface for a computer system 500 user. Input control device(s) 512 may include an alphanumeric keypad for inputting alphanumeric and other key information; and a cursor control device such as a mouse, a track pad or stylus, or cursor direction keys.

In order to display textual and graphical information, computer system 500 contains graphic subsystem 514 and output display(s) 518. Output display 518 may include a cathode ray tube (CRT) display, liquid crystal display (LCD), plasma, digital light processing (DLP) or active matrix organic light emitting diode (AMOLED) display. Graphic subsystem 516 receives textual and graphical information and processes the information for output to display 518.

In a software implementation, a method formed in accordance with an exemplary embodiment of the present invention includes a plurality of computer executable instructions, to be implemented on a computer system. Prior to loading in the computer system, the software may reside as encoded information on a computer-readable tangible or non-transitory medium such as a magnetic floppy disk, a magnetic tape, CD-ROM, DVD-ROM, flash memory, or any other suitable computer readable medium.

In a hardware implementation, such a system in accordance with an exemplary embodiment of the present invention may be realized in any suitable computer based platform known in the art. For example, the system may comprise suitable storage media and one or more dedicated processors or shared processors executing/controlling other functions, wherein the employed processor(s) is programmably configured with processor instructions for performing the functions described herein. Suitable circuits may also be developed to execute certain aspects of these functions.

Although this invention has been described in connection with specific forms and embodiments thereof, it will be appreciated that various modifications other than those discussed above may be resorted to without departing from the spirit or scope of the invention as defined in the appended claims. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined in the appended claims.

What is claimed is:

1. A display system for accelerated graphic rendering of a design layout view, the design layout represented by a plurality of graphic objects defined by respective geometry data therefor, the system comprising:
   a database storing the geometry data, the geometry data for each of the graphic objects including location and geometric portions;
   a large object module actuating retrieval of the location and geometric portions of the geometry data for each of the graphic objects within the view selectively classified to be a large object, the large objects selectively classified according to user-defined criteria;

a small object module actuating retrieval of the location portion of the geometry data, exclusive of the geometric portion, for each of the graphic objects within the view selectively classified to be a small object, the small objects selectively classified according to user-defined criteria; and, a rendering control module coupled to selectively actuate said large and small object modules to generate a composite image of the design layout view for each display of said view, the composite image including:

a geometric reproduction of each large object within the view based on the geometry data retrieved therefor; and, at least one indicia visually indicating a location of each small object within the view based on the location portion of the geometry data retrieved therefor and substituted for said small object.

2. The display system as recited in claim 1, further comprising a query execution module configured to selectively retrieve from said database at least a portion of the geometric data for the graphic objects responsive to a query transmitted thereto; wherein said small object module includes at least one small object cache populated with indicia placement data for the small objects responsive to the location portion of the geometry data retrieved therefor, the indicia placement data indicating pixel coverage of the small objects within a display area for the composite image.

3. The display system as recited in claim 2, wherein said small object module maintains in said small object cache a global array of pixel-based cells each corresponding to a selectively defined marker cell in the display area, each said marker cell containing at least one pixel of the display area, the indicia being selectively represented in the global array by filling the pixel-based cells with indicia placement data, the global array defining for the composite image a locus of marker cells visibly occupied by the small objects.

4. The display system as recited in claim 3, wherein the graphic objects collectively occupy a plurality of predefined layout layers of the design layout, said small object module maintaining in said small object cache a local array of pixel-based cells for each layout layer, the indicia placement data for small objects located in each layout layer being selectively filled in the pixel-based cells of the local array corresponding thereto, said global array defining the combined locus of pixel-based cells indicating small object occupation at one or more of the layout layers.

5. The display system as recited in claim 4, wherein said query execution module sequentially queries said database for small objects at locations in the layout layers corresponding to the pixel-based cells of the local arrays therefor, said query execution module bypassing a query for any pixel-based cell of a local array aligned with a pixel-based cell of another local array already filled with indicia placement data for a small object, each pixel-based cell of the global array being filled responsive to the filling of a matching pixel-based cell of any local array.

6. The display system as recited in claim 4, wherein each of the pixel-based cells of the local and global arrays contains a Boolean value.

7. The display system as recited in claim 2, wherein said database is of a widely accessible predetermined format, and said query execution module includes an application programming interface tool compatible with the predetermined format for selective retrieval of the geometry data therefrom.

8. The display system as recited in claim 3, wherein the graphic objects are classified based on a filter size parameter selectively set to denote a minimum span of pixels required along each dimensional reference of the display area for classification as a large object, each of the graphic objects spanning less than the minimum span of pixels along at least one dimensional reference of the display area being classified as a small object.

9. The display system as recited in claim 4, wherein said query execution module partitions the pixel-based cells of each local array into at least first and second grids of different fineness, each first grid partition including a greater number of pixel-based cells than each second grid partition, said query execution module sequentially querying said database with respect to each of the first grid partitions for small objects at corresponding locations in each layout layer, said query execution module thereafter querying said database with respect to selective ones of the second grid partitions disposed within only the first grid partitions containing at least one small object.

10. The display system as recited in claim 4, wherein each of the indicia for small objects is selectively displayed in one of a plurality of resolutions, the marker cell of the display area being selectively defined to include a greater number of pixels in one resolution than in another lower resolution.

11. A display method for accelerated graphic rendering of a design layout view, the design layout represented by a plurality of graphic objects defined by respective geometry data therefor, the method comprising:

storing the geometry data in a database, the geometry data for each of the graphic objects including location and geometric portions;

selectively retrieving the location and geometric portions of the geometry data for each graphic object within the view selectively classified to be a large object, the large objects selectively classified according to user-defined criteria;

selectively retrieving the location portion of the geometry data, exclusive of the geometric portion, for each graphic object within the view selectively classified to be a small object, the small objects selectively classified according to user-defined criteria;

maintaining at least one small object cache populated with indicia placement data for the small objects responsive to the location portion of the geometry data retrieved therefor, the indicia placement data indicating pixel coverage of the small objects within a display area; and, selectively generating a composite image of the design layout view for rendering on the display area, the composite image including:

a geometric reproduction of each large object within the view based on the geometry data retrieved therefor; and, at least one occurrence of indicia visually indicating a location of each small object within the view based on the location portion of the geometry data retrieved therefor and substituted for said small object.

12. The display method as recited in claim 11, wherein said small object cache includes a global array of pixel-based cells each corresponding to a selectively defined marker cell in the display area, each said marker cell containing at least one pixel of the display area, the indicia being selectively represented in the global array by filling the pixel-based cells with indicia placement data, the global array defining for the composite image a locus of marker cells visibly occupied by the small objects.

13. The display method as recited in claim 12, wherein the graphic objects collectively occupy a plurality of predefined layout layers of the design layout, said small object cache including a local array of pixel-based cells for each layout layer, the indicia placement data for small objects located in each layout layer being selectively filled in the pixel-based cells of the local array corresponding thereto, said global array defining the combined locus of pixel-based cells indicating small object occupation at one or more of the layout layers, each of the pixel-based cells of the local and global arrays contains a Boolean value.

14. The display method as recited in claim 13, wherein said database is of predetermined format, and an application programming interface tool compatible with the predetermined format is executed for selective retrieval of the geometry data therefrom.

15. A display system for accelerated graphic rendering of a view of a design layout represented by a plurality of graphic objects defined by respective geometry data therefor, the system comprising:
 a database storing the geometry data, the geometry data for each of the graphic objects including location and geometric portions, said database being of predetermined format;
 a large object module actuating retrieval of the location and geometric portions of the geometry data for each of the graphic objects within the view selectively classified to be a large object, the large objects selectively classified according to user-defined criteria;
 a small object module actuating retrieval of the location portion of the geometry data, exclusive of the geometric portion, for each of the graphic objects within the view selectively classified to be a small object, the small objects selectively classified according to user-defined criteria, said small object module including:
  at least one small object cache populated with indicia placement data for the small objects responsive to the location portion of the geometry data retrieved therefor, the indicia placement data indicating pixel coverage of the small objects within a display area; and,
  a global array maintained in said small object cache, the global array being formed by a plurality of pixel-based cells each corresponding to a selectively defined marker cell in the display area, each said marker cell containing at least one pixel of the display area, the indicia being selectively represented in the global array by filling the pixel-based cells with indicia placement data, the global array defining a locus of marker cells visibly occupied by the small objects;
 a query execution module including an application programming interface tool executed to selectively retrieve from said database at least a portion of the geometric data for the graphic objects responsive to a query transmitted thereto by said large and small object modules; and,
 a rendering control module coupled to selectively actuate said large and small object modules to generate a composite image of the design layout for rendering within the display area, the composite image including:
  a geometric reproduction of each large object within the view based on the geometry data retrieved therefor; and,
  at least one indicia visually indicating a location of each small object within the view based on the location portion of the geometry data retrieved therefor and substituted for said small object.

16. The display method as recited in claim 12, wherein:
 the graphic objects are classified based on a filter size parameter selectively set to denote a minimum span of pixels required along each dimensional reference of the display area for classification as a large object, each of the graphic objects spanning less than the minimum span of pixels along at least one dimensional reference of the display area being classified as a small object;
 the indicia for each small object of the composite image is defined by commonly actuating each pixel within each marker cell of the indicia, wherein each of the indicia for small objects is selectively displayed in one of a plurality of resolutions, the marker cell of the display area being selectively defined to include a greater number of pixels in one resolution than in another lower resolution; and,
 each occurrence of the indicia for small objects is selectively displayed in one of a plurality of resolutions, the marker cell of the display area being selectively defined to include a greater number of pixels in one resolution than in another lower resolution.

17. The display method as recited in claim 12, wherein said database is sequentially queried for small objects at locations in the layout layers corresponding to the pixel-based cells of the local arrays therefor, a query being bypassed for any pixel-based cell of a local array aligned with a pixel-based cell of another local array already filled with indicia placement data for a small object, each pixel-based cell of the global array being filled responsive to the filling of a matching pixel-based cell of any local array.

18. The display method as recited in claim 12, wherein the pixel-based cells of each local array are partitioned into at least first and second grids of different fineness, each first grid partition including a greater number of pixel-based cells than each second grid partition, said database being sequentially queried with respect to each of the first grid partitions for small objects at corresponding locations in each layout layer, said database being thereafter queried with respect to selective ones of the second grid partitions disposed within only the first grid partitions containing at least one small object.

19. The display system as recited in claim 3, wherein:
 the graphic objects collectively occupy a plurality of predefined layout layers of the design layout, said small object module maintaining in said small object cache a local array of pixel-based cells for each layout layer, the indicia placement data for small objects located in each layout layer being selectively filled in the pixel-based cells of the local array corresponding thereto, said global array defining the combined locus of pixel-based cells indicating small object occupation at one or more of the layout layers; and,
 each of the indicia for small objects is selectively displayed in one of a plurality of resolutions, the marker cell of the display area being selectively defined to include a greater number of pixels in one resolution than in another lower resolution.

20. The display system as recited in claim 8, wherein the indicia for each small object of the composite image is defined by commonly actuating each pixel within each marker cell of the indicia.

* * * * *